(12) United States Patent
Best

(10) Patent No.: US 9,070,206 B2
(45) Date of Patent: Jun. 30, 2015

(54) PROVIDING A VISIBLE LIGHT SOURCE IN AN INTERACTIVE THREE-DIMENSIONAL COMPOSITING APPLICATION

(75) Inventor: Charles J. L. Best, Beverly Hills, CA (US)

(73) Assignee: APPLE INC., Cupertino, CA (US)

( * ) Notice: Subject to any disclaimer, the term of this patent is extended or adjusted under 35 U.S.C. 154(b) by 720 days.

(21) Appl. No.: 12/551,529

(22) Filed: Aug. 31, 2009

(65) Prior Publication Data

US 2010/0302244 A1 Dec. 2, 2010

Related U.S. Application Data

(60) Provisional application No. 61/182,715, filed on May 30, 2009.

(51) Int. Cl.
  *G06T 15/50* (2011.01)
  *G06T 19/00* (2011.01)
  *G06T 15/06* (2011.01)

(52) U.S. Cl.
  CPC .............. *G06T 19/00* (2013.01); *G06T 15/06* (2013.01); *G06T 15/50* (2013.01)

(58) Field of Classification Search
  CPC .............................. G06T 15/50; G06T 19/00
  USPC ........................................................ 345/426
  See application file for complete search history.

(56) References Cited

U.S. PATENT DOCUMENTS

| | | | |
|---|---|---|---|
| 5,742,292 A | 4/1998 | Murata | |
| 6,169,553 B1 | 1/2001 | Fuller et al. | |
| 6,362,822 B1* | 3/2002 | Randel | 345/426 |
| 7,675,518 B1 | 3/2010 | Miller | |
| 2003/0080966 A1* | 5/2003 | Blaho | 345/582 |
| 2005/0151747 A1 | 7/2005 | Kim et al. | |
| 2006/0176303 A1 | 8/2006 | Fairclough | |
| 2008/0273242 A1 | 11/2008 | Woodgate et al. | |
| 2008/0309663 A1* | 12/2008 | Fukushima et al. | 345/419 |
| 2009/0032510 A1* | 2/2009 | Ando et al. | 219/121.72 |

(Continued)

FOREIGN PATENT DOCUMENTS

JP    6-301796    10/1994

OTHER PUBLICATIONS www.windwardmark.net, NPL Date 2006-2007. Wimdward Mark Interactive LLC pp. 1-7.*

(Continued)

*Primary Examiner* — Devona Faulk
*Assistant Examiner* — Wynton S Jones
(74) *Attorney, Agent, or Firm* — Adeli LLP

(57) ABSTRACT

Some embodiments provide a three dimensional (3D) compositing application that provides a set of lighting tools for the user to better visualize the effects of a light in a 3D space by allowing a user to incorporate interactive visible light sources into a 3D scene that may be a part of a 3D project. The visible light source can be incorporated along each one of three axes independently of the other two of the three axes. The light tools allow the visible light sources that are incorporated into the 3D scene to be rendered for the final composited project, or to be rendered and displayed only during the 3D scene's compositing process to assist the user's visualization. Interactive rendering of the objects, including visible light sources, allow for any adjustments to the 3D scene to be displayed with minimal user-perceivable delay.

24 Claims, 25 Drawing Sheets

(56) References Cited

U.S. PATENT DOCUMENTS

2009/0046097 A1     2/2009   Franklin
2010/0302245 A1    12/2010   Best

OTHER PUBLICATIONS

Adding Rays of Light (http://www.myjanee.com/tuts/rays/rays.htm), Jan. 22, 2008.*
U.S. Appl. No. 12/551,539, filed Aug. 31, 2009, Best, Charles J. L.
"http://www.windwardmark.net/images/screenshots/windlight/water5.jpg", NPL Date N/A, Windward Mark Interactive LLC.
"http://www.windwardmark.net/images/screenshots/windlight/urban9.jpg", NPL Date N/A, Windward Mark Interactive LLC.
"New Features in Motion 3", 2007 (Month N/A), Apple Inc.
"Motion 3 User Manual", 2007 (Month N/A), Apple Inc., Cupertino, CA.
"Motion 3 Supplemental Documentation", 2007 (Month N/A), Apple Inc.
Author Unknown, "Adobe Director 11: User Guide," Month Unknown, 2008, 498 pages, Adobe Systems Incorporated, San Jose, California, USA.
Portions of prosecution history of U.S. Appl. No. 12/551,539, filed Feb. 14, 2012, Best, Charles J. L.
Updated portions of prosecution history of U.S. Appl. No. 12/551,539, filed Oct. 16, 2013, Best, Charles J. L.

* cited by examiner

PROVIDING A VISIBLE LIGHT SOURCE IN AN INTERACTIVE THREE-DIMENSIONAL COMPOSITING APPLICATION

CLAIM OF BENEFIT TO PRIOR APPLICATIONS

This application claims the benefit of U.S. Provisional Application 61/182,715, entitled "Providing a Visible Light Source in an Interactive Three-Dimensional Compositing Application", filed May 30, 2009. The contents of U.S. Provisional Application 61/182,715 are hereby incorporated by reference.

CROSS REFERENCE TO RELATED APPLICATION

This application is related to U.S. patent application Ser. No. 12/551,539, filed on Aug. 31, 2009, now published as U.S. Patent Publication No. 2010/0302245.

FIELD OF THE INVENTION

The present invention is directed towards media editing. Specifically, the present invention provides techniques and tools for incorporating an interactive visible light source into a three dimensional space when performing media editing.

BACKGROUND OF THE INVENTION

Three dimensional (3D) digital graphic design, video editing, and media-editing applications provide designers and artists with the necessary tools to create much of the media seen today through the various media outlets. These tools allow designers the ability to generate, compose, composite, and animate the images and videos in a virtual 3D digital space.

A virtual 3D digital space, like real-world space, requires lighting in order for the objects within to be visually perceived. Without any light added, the virtual 3D digital space would appear completely dark even if there are objects that are composited within the space. Media editing applications provide tools for adding light sources into the 3D space. For instance, an ambient light in the 3D space illuminates all objects in the space from all directions equally for an overall fill effect, or to add a color cast.

In addition to the uniform illumination provided by the ambient light feature, media editing applications also provide ways of illuminating objects with lights that cast a particular lighting pattern onto objects. For instance, an elliptical lighting pattern can be cast onto objects as if emitted by a spot light in space. Alternatively, a gradient of light can be cast onto an object in space as if emitted by a light bulb.

One problem a user encounters when working with interactive media applications, such as the one whose virtual 3D space is illustrated in FIG. 1, is that only the lighting patterns on the surfaces of objects are visible. For example, as illustrated in FIG. 1, a light source has been added into a virtual 3D digital space 100, which is also an interactive work space. The light source illuminates any surfaces that are within the light's modeled range, such as media object 110, which appears to be lit from a position near the bottom left hand corner of the object. The source of the light is modeled as either a set of axes 115, or as a line-drawing 220 of a sphere as shown in FIG. 2, which represents the 3D structure and position of the light.

The elliptical lighting pattern is another example of lighting provided by a media editing application where only the lighting patterns on the surfaces of objects are visible. As previously mentioned, an elliptical lighting pattern can be cast onto objects in the 3D space as if the elliptical light pattern is emitted by a spot light. However, like in the examples illustrated in FIGS. 1 and 2, only the elliptical pattern effect of the light is visible on the surfaces within the light's range, while the light itself is merely modeled by a set of axes or by an icon.

A user may manually illustrate a realistic-appearing light source, for example, by compositing an opaque white circle over a larger semi-transparent white circle and inserting the composite illustration into the virtual 3D space 100 at the appropriate location to simulate the light source. A user may also manually illustrate other effects of lights, such as a visible light beam to represent light rays emitted by a spot light.

Such manual compositing is time-consuming, and is not easily modified from within the 3D interactive compositing work space. Furthermore, the manual illustration is merely a simulation of a light effect. There is thus a need to provide the user with more lighting effects than just lighting patterns cast onto the surfaces of objects, without requiring the user to manually illustrate and composite simulations of such lighting effects.

The concepts described in this section have not necessarily been previously conceived, or implemented in any prior approach. Therefore, unless otherwise indicated, it should not be assumed that any concepts described in this section qualify as prior art merely by virtue of their inclusion in this section.

SUMMARY OF THE INVENTION

Some embodiments provide a three dimensional (3D) compositing application that provides a set of lighting tools for the user to better visualize the effects of a light in a 3D space by allowing a user to incorporate in a 3D scene interactive light sources that are visible. The 3D scene may be part of a set of 3D scenes that are composited together to form a 3D project. The light tools allow the visible light sources that are incorporated into the 3D scene to be rendered objects for the final composited project, or to be displayed interactively and used during the 3D scene's compositing process to assist the user's visualization. Accordingly, the display presentation of some embodiments is done either during compositing process to aid the user visualization or is done as a post compositing step to display the final rendered composite scene that is, e.g., saved on a storage medium for distribution.

Interactive generation of display presentation of the objects allows for any adjustments to the 3D scene to be dynamically reflected with minimal user-perceivable delay. All objects in the scene, including visible light sources, are dynamically displayed in an interactively generated display presentation. Additional rendering can also be applied to the 3D project using an offline rendering process to produce a fixed image, or a sequence of playable media frames, for the 3D scene.

In some embodiments, the interactive display presentation is in the form of a high quality rendered scene in which the interactively displayed scene has the same quality as a final rendered composite scene. However, one of ordinary skill in the art would realize that other embodiments can generate interactive display presentations that are of intermediate or low quality displays or previews without departing from the spirit of the invention. Accordingly, throughout this specification, the terms interactive display, interactive display presentation, interactive rendering, preview, etc. are used interchangeably to refer to a display that is generated and/or updated during compositing process of some embodiments.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
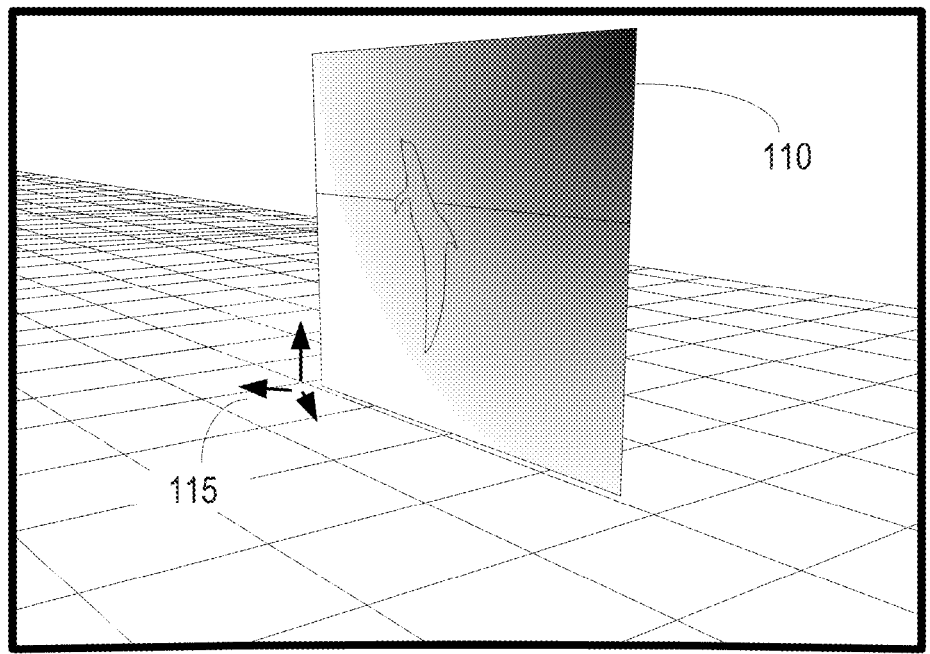
FIGS. 1-2 illustrate a typical interactive media application displaying a point light that is shown as a set of axes or a line drawing of a sphere according to a prior approach.
Figure 2:
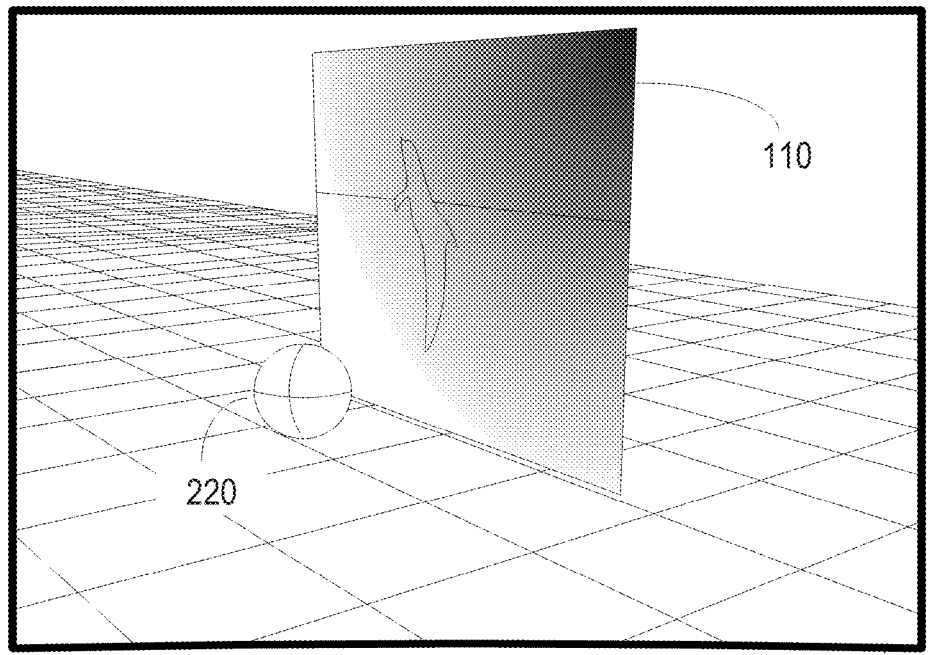

In the following detailed description of the invention, numerous details, examples, and embodiments of the invention are set forth and described. In other instances, well-known structures and devices are shown in block diagram form in order not to obscure the description of the invention with unnecessary detail. However, it will be clear and apparent to one skilled in the art that the invention is not limited to the embodiments set forth and that the invention may be practiced without some of the specific details and examples discussed.

Some embodiments provide a three dimensional (3D) compositing application that provides a set of lighting tools for the user to better visualize the effects of a light in a 3D space by allowing a user to incorporate in a 3D scene interactive light sources that are visible. The 3D scene may be part of a set of 3D scenes that are composited together to form a 3D project. The light tools allow the visible light sources that are incorporated into the 3D scene to be rendered objects for the final composited project, or to be displayed interactively and used during the 3D scene's compositing process to assist the user's visualization. Accordingly, the display presentation of some embodiments is done either during compositing process to aid the user visualization or is done as a post compositing step to display the final rendered composite scene that is, e.g., saved on a storage medium for distribution.

Interactive generation of display presentation of the objects allows for any adjustments to the 3D scene to be dynamically reflected with minimal user-perceivable delay. All objects in the scene, including visible light sources, are dynamically displayed in an interactively generated display presentation. Additional rendering can also be applied to the 3D project using an offline rendering process to produce a fixed image, or a sequence of playable media frames, for the 3D scene.

In some embodiments, the interactive display presentation is in the form of a high quality rendered scene in which the interactively displayed scene has the same quality as a final rendered composite scene. However, one of ordinary skill in the art would realize that other embodiments can generate interactive display presentations that are of intermediate or low quality displays or previews without departing from the spirit of the invention. Accordingly, throughout this specification, the terms interactive display, interactive display presentation, interactive rendering, preview, etc. are used interchangeably to refer to a display that is generated and/or updated during compositing process of some embodiments.

In some embodiments, the 3D compositing application provides interactivity on three levels. First, the 3D compositing application provides user interactivity. User interactivity allows for any adjustments to the scene to be visually reflected in a composite display area for the 3D compositing application with minimal user-perceivable delay. When a user makes an adjustment to the scene, the time that takes for the 3D compositing application to display an updated image to reflect the adjustment is limited by the second level of interactivity, performance interactivity. Performance interactivity refers to providing fast graphical processing speeds for the 3D compositing application such that an updated frame is generated interactively with minimal user-perceivable delay, typically measured as a refresh rate in frames per second ("fps"). For instance, if the performance interactivity provides for a refresh rate of at least 3 fps, then any adjustments made by the user would take at most one-third of a second to appear, thereby achieving user interactivity.

Finally, the 3D compositing application provides for object interactivity between all objects in the composited scene, including visible lights. Object interactivity allows for the characteristics of an object to affect another object in the 3D scene as if they were objects positioned in the real-world. Accordingly, when two objects in the 3D scene intersect (i.e. a portion of one object occupy the same space as a portion of another object), the 3D compositing application performs operations to determine and to specify how the objects intersect. For instance, a visible light source demonstrates interactivity when intersected with another object in the 3D scene by appearing partially occluded if the other object appears in front of portions of the visible light source.

Interactive display presentation generation of the objects allows for any adjustments to the 3D scene to be dynamically reflected with minimal user-perceivable delay. All objects in the scene, including visible light sources, are dynamically displayed in an interactively generated display presentation. Additional rendering can also be applied to the 3D project using an offline rendering process to produce a fixed image, or a sequence of playable media frames, for the 3D scene.

The 3D compositing application provides a graphical user interface (GUI) that has a 3D composite display area for displaying a representation of a 3D scene with one or more objects dispersed anywhere throughout a 3D space. The 3D compositing application also provides a set of lighting tools to position one or more visible point light and spot light sources, collectively referred to herein as visible light sources, anywhere in the 3D space. The lighting tools include a panel that displays controls for each of the objects that are dispersed into the 3D space, including controls for each of the visible light sources. The visible light sources may be interactively adjusted using controls provided by the 3D compositing application. The adjustments are interactively displayed for the affected visible light sources in the composite display area, and are also dynamically reflected in the appearance of the other objects in the 3D space affected by the adjustments to the visible light sources.

Some embodiments provide volume light techniques and controls for a video editing application. The volume light techniques include controlling and modifying properties and attributes for light that passes through an artificial medium (e.g., atmosphere or fog) created for a 3D space. Some embodiments provide user interface controls and attributes and the corresponding implementation for the controls and attributes to specify how the light from a source is displayed as the light passes from the source through the artificial medium of the 3D space. These controls allow a user to control attributes such as the density, start, stop, and fall-off parameters for the volume light and the artificial medium.

Figure 3:
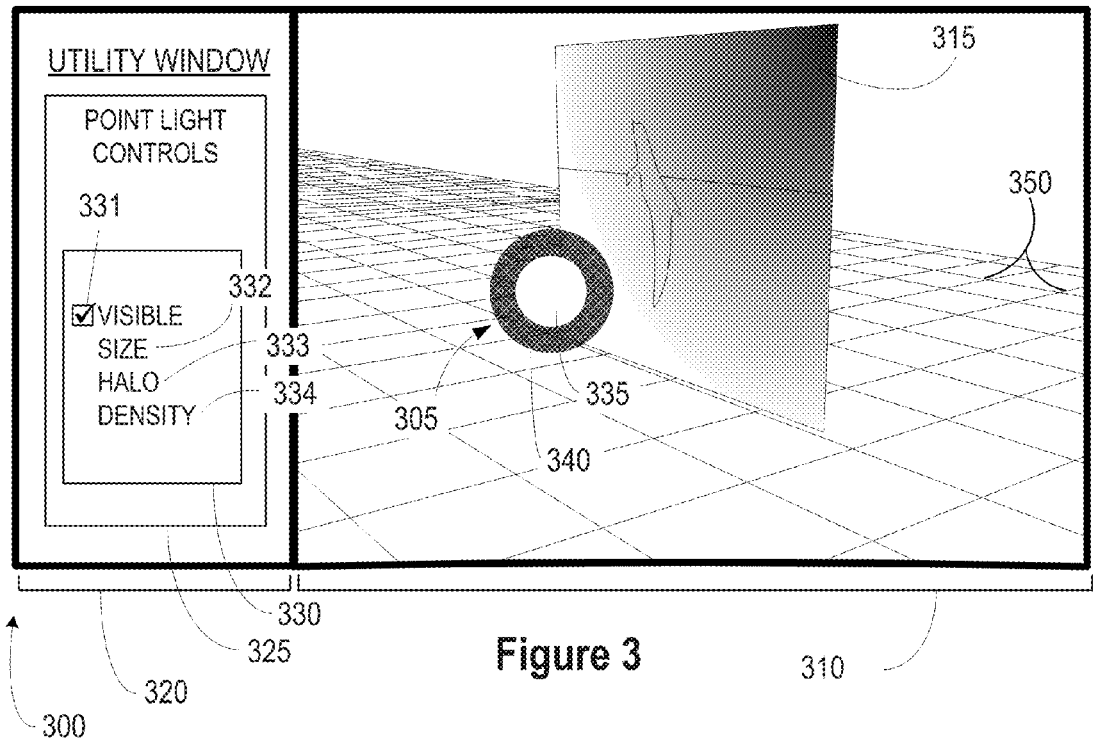
FIG. 3 illustrates a graphical user interface ("GUI") with an interactive visible light source, shown as a visible point light, inserted as an object in a three-dimensional composite display area, according to some embodiments of the invention.
Figure 4:
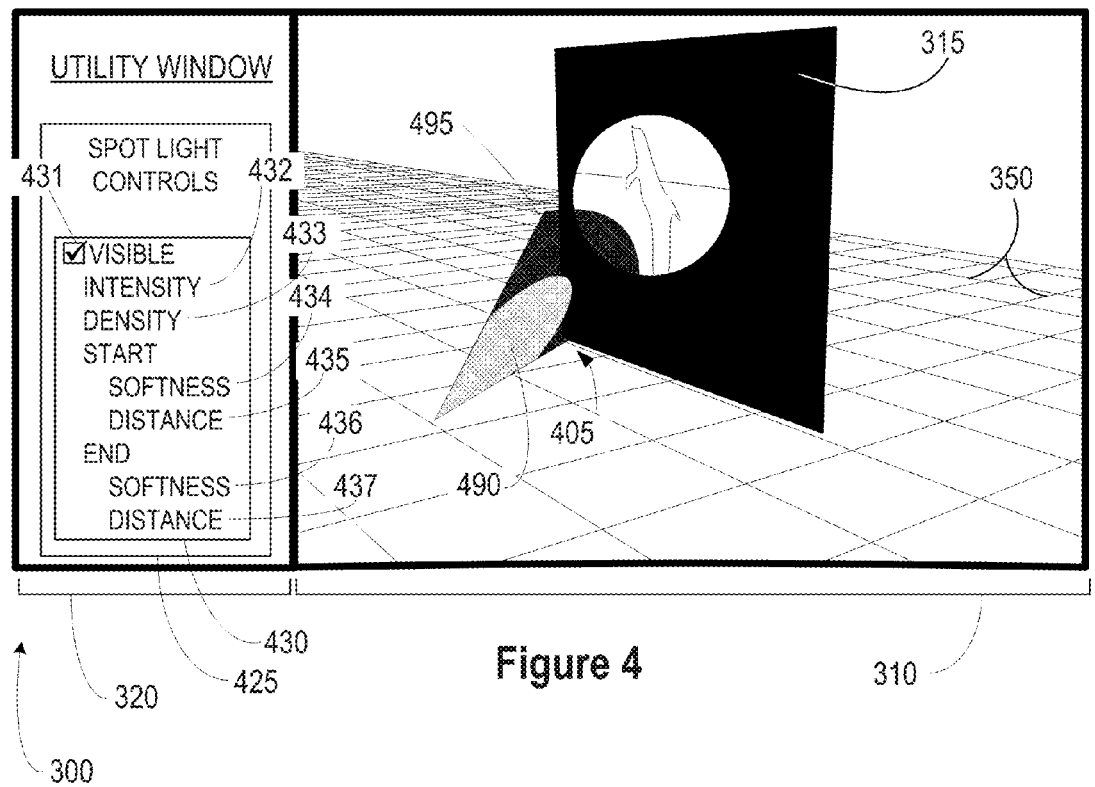
FIG. 4 illustrates a GUI with an interactive visible light source representation, shown as a spot light volume, inserted into the 3D composite display area, according to some embodiments of the invention.

Several more embodiments of the invention are described below. FIGS. 3-4 illustrate a GUI 300 of a 3D compositing application that allows a user to incorporate interactive visible light sources into a 3D scene in accordance with some embodiments of the invention. Specifically, FIG. 3 illustrates the GUI 300 with an interactive visible light source, shown as a visible point light 305, inserted as an object in a 3D composite display area 310. The 3D composite display area 310 has also inserted within it a media object 315 that is positioned behind the visible point light 305. FIG. 3 also illustrates a utility window 320 with a panel of point light controls 325 for the point light. The point light controls 325 include a portion 330 designated for controlling several visible point light source parameters.

In the example illustrated in FIG. 3, visible point light 305 is a 3D object positioned within the 3D space. Visible point light 305 emits light outward from a single point in the 3D space in all directions, illuminating any objects within the reach of the light. While the light is modeled as being emitted from a single point, visible point light 305 is shown having a solid spherical core 335 and a semi-transparent halo 340, the sizes of both of which can be adjusted. Visible point light 305 can thus be likened to a frosted incandescent bulb that is emitting light. The emitted light appears as if it is traveling through a 3D space with reflective particles evenly dispersed and suspended in a simulated atmosphere surrounding the visible point light 305. Halo 340 illustrates the visual effect of the emitted light interacting with the simulated atmosphere though which the emitted light travels. In some embodiments, the simulated atmosphere is not actually modeled, and the halo 340 is directly defined using specific values affecting transparency and other visual effects so that it appears as if an atmosphere is present in the displayed image. The size of both the solid spherical core 335 and halo 340 may be changed independently without affecting the intensity defined for the point light.

The 3D composite display area 310 displays an interactively generated display presentation (or interactive display, interactive rendering, preview, etc.) of a 3D scene with one or more objects dispersed throughout a 3D space. In some embodiments, the 3D composite display area 310 has grid lines 350 which are not objects in the 3D composite display area 310, but are presented to guide the user in navigating the 3D space.

In some embodiments, the 3D space into which the 3D scene is composited has dimensions of width, length, and depth. An object, which may include a visible light source, incorporated into the 3D space occupies a position within the 3D space. Accordingly, a visible light source may be positioned above, behind, in front of, below, or to either side of another object in the scene. Real-world physical optical properties are displayed through the 3D composite display area.

For example, an object that intersects a visible light source in the 3D space will be partially occluded by the visible light source, and the visible light source will be partially occluded by the object.

The perspective from which the 3D space is displayed within the 3D composite display area 310 may be adjusted to show a different perspective. For instance, the compositing application may receive a command from a user to pivot or rotate the 3D space to show a different perspective. The 3D objects inserted into the 3D scenes, including any visible light sources, can be viewed from any angle by adjusting the perspective of the 3D space as presented by the 3D composite display area 310. The view that is displayed on a user's computer screen can be conceptually described as being seen from a camera's, or eye's, perspective, as if the image of the 3D space is captured by a camera, or by a viewer's eye.

Media object 315 is one of many objects that may be composited into the 3D scene and positioned inside the 3D space presented within the 3D composite display area 310. As illustrated in FIG. 3, media object 315 is a video clip that is positioned behind visible point light 305, as viewed by this particular camera perspective. As shown, visible point light 305 emits light that is reflected off the surface of media object 315. Objects that may be positioned inside the 3D space include images, lights, video media, text, geometric shapes, and other visual objects.

As shown in FIG. 3, utility window 320 provides a variety of controls for each of the objects inserted into a 3D scene, including point light controls for each point light. Utility window 320 also provides the user with a variety of utilities that are not shown in FIG. 3, including a file browser and a library of the objects dispersed in the 3D space from all the 3D scenes that are composited into a 3D project.

Point light controls 325 include visible point light controls 330 designated for visible point light parameters. Visible point light controls 330 include a mechanism to turn the visible point light on or off by checking or unchecking the "visible" checkbox 331. In some embodiments, removing the visible point light by unchecking the "visible" checkbox 331 does not remove the effect of the point light from the 3D project. Instead, the objects in the 3D space continue to be illuminated with light from the point light location, which is now represented by a set of axes or an icon instead of a visible point light.

Visible point light controls 330 also include a control 332 for adjusting the size of solid core 335, and a control 333 for adjusting the extent of the halo 340. The adjustments made using the controls are immediately reflected in the appearance of visible point light 305 and in any objects in the 3D space affected by the adjustments.

Halo 340, as mentioned above, simulates the visual effect of the emitted light from the point light interacting with the atmosphere through which the emitted light travels. In some embodiments, visible point light controls 330 include a control 334 for changing the apparent density of the particles in the atmosphere in the 3D space around the point light. Increasing the density value causes halo 340 to appear more opaque, and decreasing the density value causes the halo 340 to appear more transparent. In some other embodiments, the density and appearance of the halo 340 is defined as a function of a defined extent of the halo 340 and a defined intensity of the emitted light.

In some embodiments of the invention, the density value of the particles does not actually represent a density of particles in the atmosphere in which halo 340 appears. Instead, the density value of the particles is a property of the halo 340 that is defined separately from properties of the atmosphere for the 3D scene. Accordingly, two or more halos can appear in the same general atmosphere having different densities defined for each halo. In some embodiments, the density value is a property of the halo 340 that directly affects the transparency and other visual effects of the halo 340. In such an embodiment, the halo 340 gives the appearance that an atmosphere is present in the displayed image of the halo 340.

Another visible light source that can be incorporated into a 3D project is a visible spot light source. FIG. 4 illustrates the GUI 300 with an interactive visible light source, shown as a spot light volume 405, inserted into the 3D composite display area 310. FIG. 4 shows 3D composite display area 310 with media object 315 that is positioned behind spot light volume 405 as viewed by this particular camera perspective. The 3D composite display area 310 includes grid lines 350 for guiding the user in navigating the 3D space. FIG. 4 also illustrates utility window with a panel of spot light controls 425 for the spot light. Spot light controls 425 include a portion designated for controlling several visible spot light volume parameters 430.

Spot light volume 405 is a 3D object positioned within the 3D space. Spot light volume 405 originates from a spot light that is positioned within the 3D space. A spot light emits light from a geometric point in a conical pattern, casts the spot light volume 405, and casts an elliptical pattern onto objects hit by the light. Spot light volume 405 of the spot light is shown as a semi-transparent image that represents a conical beam, or volume, of light shining through the 3D space. The spot light volume 405 appears as if light rays are shone through particles with refractive and reflective properties are dispersed in a simulated atmosphere. Accordingly, because the light rays are modeled as being reflected and refracted by the particles in the simulated atmosphere, the light rays from the spot light appear as a conical spot light volume 405 in the 3D space.

In some embodiments, the simulated atmosphere is not actually modeled. Instead, the spot light volume 405 is directly defined using specific values affecting transparency and other visual effects so that it appears as if an atmosphere is present in the interactively generated display presentation of the spot light volume 405. In some embodiments, the simulated atmosphere is a property of the spot light volume 405 as a 3D object, and is not a property of the 3D space into which the spot light volume 405 is inserted and positioned.

In some embodiments of the invention, the spot light is composed of a geometric point light, emitting light in all directions, that is positioned at the apex of an imaginary open-based cone with a reflective interior. Accordingly, in these embodiments and as shown in FIG. 4, spot light volume 405 appears to have an inner volume (or spot umbra) 490 that is brighter than the outer volume (or spot penumbra) 495. In some embodiments, the brightness is shown as receding to the edges of the cone due to a fall off in intensity of the light rays, and due to fewer light rays overlapping in the light volume.

In some embodiments, the light source for the spot light is modeled as an entity that is larger than a geometric point. Such a light source that is larger than a geometric point is also referred to as a light with area (or an area light). However, as shown in FIG. 4, the spot light source itself is not illustrated, and only the light volume is displayed. Some embodiments of the invention may also display an interactive spot light source in addition to displaying the light volume.

Several parameters of the spot light volume 405 can be controlled and adjusted. Utility window 320, in addition to providing point light controls 325 and other controls, can also provide spot light controls 425. The adjustments made using the controls are immediately reflected in the appearance of spot light volume 405 and in any objects affected by the adjustment in the 3D space. Spot light controls 425 include visible spot light controls 430 designated for spot light volume parameters.

Visible spot light controls 430 include a mechanism to turn the spot light volume 405 on or off by checking or unchecking the "visible" checkbox 431. In some embodiments, removing the spot light volume 405 by unchecking the "visible" checkbox does not remove the effect of the spot light from the 3D project. Instead, the objects in the 3D space continue to be illuminated with light from the spot light location, which is now represented by a set of axes or an icon instead of a visible light volume. In the example illustrated in FIG. 4, unchecking the "visible" checkbox results in the compositing application maintaining the elliptical illumination on media object 315, while removing the spot light volume 405 from the scene.

Visible spot light controls 430 also provide a control 432 for adjusting the intensity of the spot light, a control 433 for adjusting the density of the spot light volume 405, softness controls 434 and 436 for adjusting the extent of spot light volume 405 from where it starts and ends, and controls 435 and 437 for adjusting the distance from the source point where spot light volume 405 starts and ends. Further detailed descriptions of these parameters are provided in the sections below.

Interactive visible light sources, such as visible point light 305 and spot light volume 405 described above, can assist the user in adding surface lighting into a 3D project. When a user adds a point light or a spot light to add surface light effects into a 3D project, the user can check the "visible" checkbox 331 and 431 to interactively generate a display presentation of the visible point light or spot light volume while the user adjusts the light controls to create the desired surface light effect. When the adjustment process is completed, the user may remove the visible light by unchecking the "visible" box without changing the surface lighting in the scene.

The interactive visible light sources can also remain, and become visible objects in the scene in the final rendered output of the 3D compositing application. Additionally, the semi-transparent volume effects, such as the halo and the spot light volume, allow the user to add the illusion of atmospheric conditions, such as fog or mist, into the 3D space, because the visibility of the halo and spot light volume give the appearance of presence of such atmospheric particles in the 3D space even when an atmosphere is not defined generally for the 3D scene.

Figure 5:
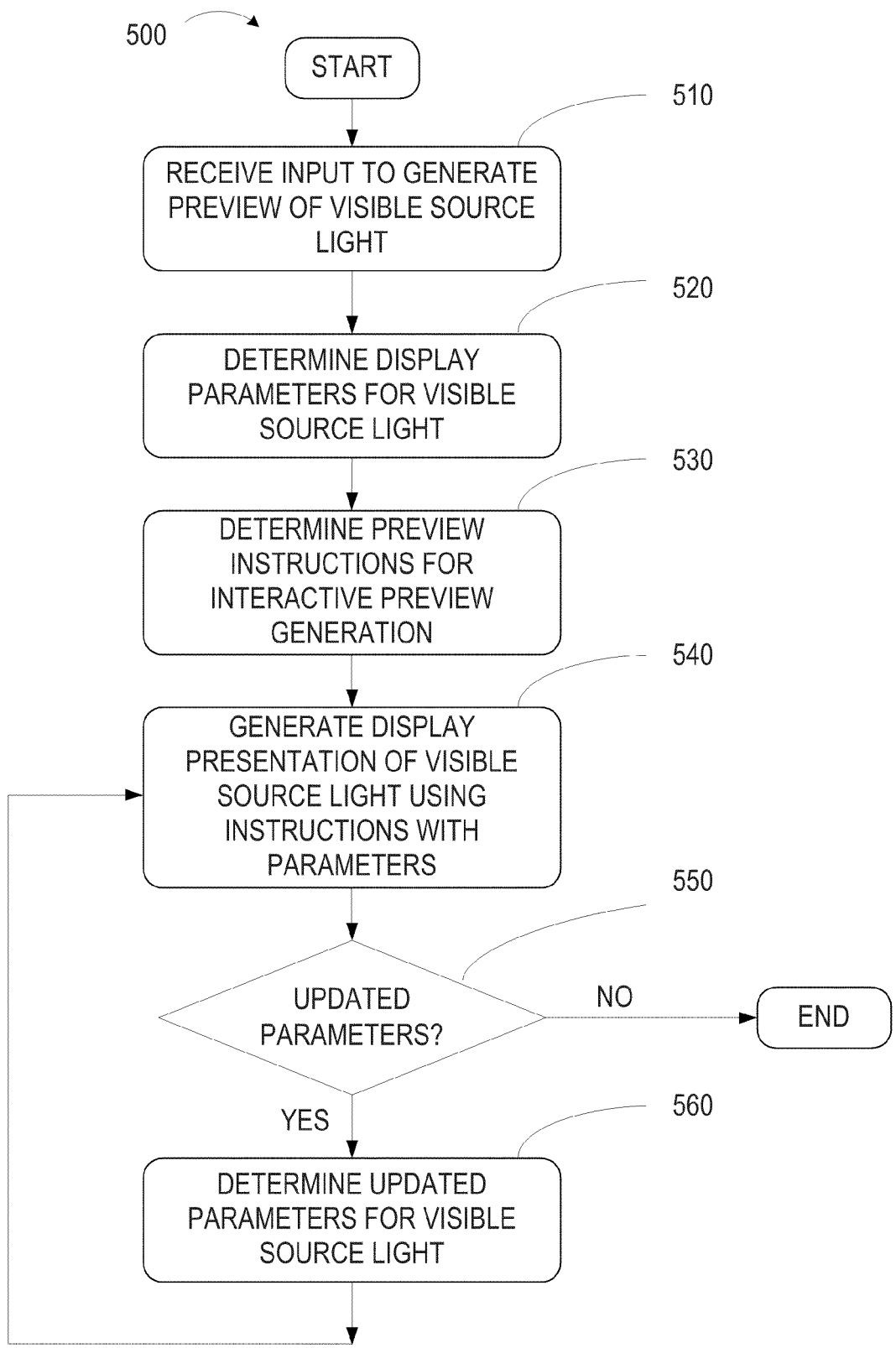
FIG. 5 illustrates an example of a conceptual machine-executed process 500 for incorporating a visible light source into a 3D scene.

FIG. 5 illustrates an example of a conceptual machine-executed process 500 for incorporating a visible light source into a 3D scene. The specific operations of the process may not be performed in the exact order described. The specific operations may not be performed in or as one continuous series of operations. Different specific operations may be performed in different embodiments. Furthermore, the process could be implemented using several sub-processes, or as part of a larger macro-process.

As shown, the process 500 receives (at 510) input from a user to interactively generate a display presentation of a light source that is visible, such as a point light source or a spot light source. Such input includes, for instance, input that sets the checkbox 670 for the "light" parameter as displayed in layers interface 631 to "On," and input that sets visible light checkbox 730 to "On." In some embodiments, the visible light checkbox 730 is set to "On" by default whenever a light is added to the scene.

Next, the process 500 determines (at 520) certain display parameters based on the values that are set in various controls for the visible light source. The display parameters include each of the parameters that are set in light parameters panel 720 (further described below), as well as parameters that are related to the 3D scene, including parameters such as the current camera perspective and the current zoom level. The process then determines (at 530) the instructions to interactively generate a display presentation of the visible light source. The process 500 generates (at 540) a display presentation of the visible light source using the display parameters with the display presentation instructions. The process determines (at 550) whether any updates to any display parameters are received. If so, the process determines (at 560) the updated parameters, and the process interactively generates (back at 540) a display presentation of an updated visible light source with the new display parameters. Otherwise, the process ends.

I. Media-Editing Application

Figure 6:
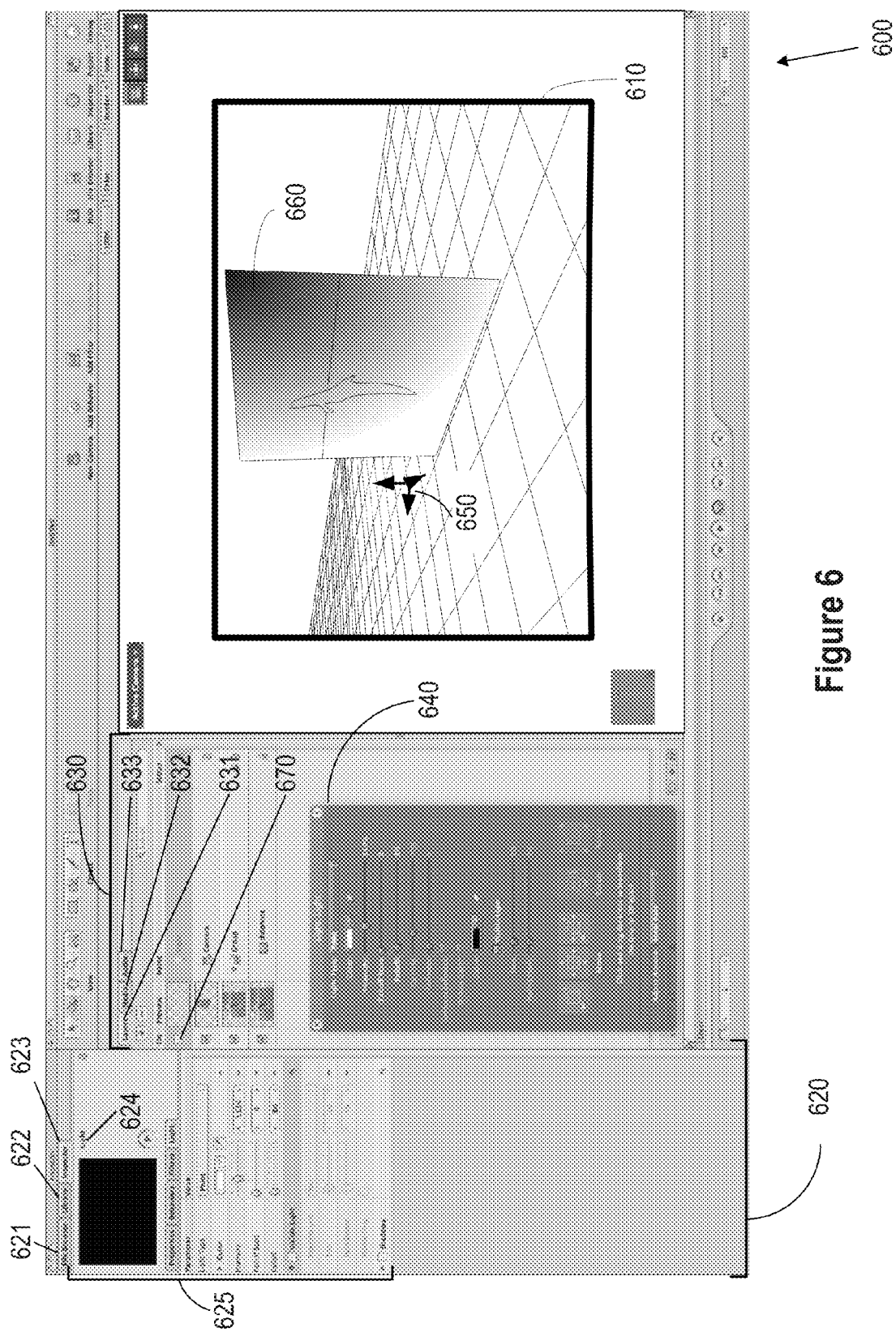
FIG. 6 illustrates an example of a 3D compositing application of some embodiments.

FIG. 6 illustrates an example of a 3D compositing application of some embodiments. The 3D compositing application 600 provides (1) a 3D composite display area 610, (2) a utility window 620, (3) a project pane 630, and (4) a heads-up display ("HUD") 640. In FIG. 6, the main display window 610 is displaying a point light object 650, illustrated as the three axes, casting light onto a media object 660.

The 3D compositing application, represented by graphical user interface (GUI) 600, provides 3D composite display area 610 with which a user may interact to composite a 3D project. The 3D composite display area 610 also has a set of grid lines that provides the user with visual feedback regarding the current perspective of the 3D space, which can be turned on or off by the user. The grid lines are normally not displayed as objects in the scene. The illustrations described throughout in this specification show the composite display area 610 as having a white background and black grid lines. However, in some embodiments, 3D composite display area 610 has a black background to better represent an unlit empty 3D space, with grid lines that are not black. The 3D composite display area 610 can be adjusted to show different views of the 3D space. For instance, a different portion of the 3D space may be shown, and/or the angle from which the 3D space is viewed may be adjusted. The view as displayed on a user's computer screen can be called a camera's perspective, conveying the concept of the view as an image of the 3D space as captured by a camera.

As previously mentioned, the 3D compositing application provides interactivity on three levels. First, the 3D compositing application provides user interactivity. User interactivity allows for any adjustments to the scene to be visually reflected in the composite display area 610 for the 3D compositing application with minimal user-perceivable delay. When a user makes an adjustment to the scene, the time that takes for the 3D compositing application to display an updated image to reflect the adjustment is limited by the second level of interactivity, performance interactivity. Performance interactivity refers to providing fast graphical processing speeds for the 3D compositing application such that an updated frame is interactively generated in the composite display area 610 with minimal user-perceivable delay, typically measured as a refresh rate in frames per second. The faster the refresh rate, the shorter the delay, and the better the interactivity.

Finally, the 3D compositing application provides for object interactivity between all objects in the composited scene, including visible lights. Object interactivity allows for the characteristics of an object to affect another object. For instance, a visible light source demonstrates interactivity when intersected with another object in the 3D scene by appearing partially occluded if the other object appears in front of portions of the visible light source.

Interactive generation of display presentation of the objects allows for any adjustments to the 3D scene to be dynamically reflected with minimal user-perceivable delay. Display presentations are interactively generated for all objects in the scene. Additional rendering can also be applied to the 3D project using an offline pre-rendering process to produce a fixed image, or a sequence of playable media frames, for the 3D scene.

In some embodiments of the invention, the 3D compositing application 600 provides utility window 620 with which a user may interact to composite a 3D project. In the example as illustrated in FIG. 6, utility window 620 includes three selectable tabs through which a user can access interfaces for certain features and functions of 3D compositing application 600. The first tab 621 is for accessing a file browser, which displays a list of files comprising media objects that can be inserted into the 3D project. The second tab 622 is for accessing a library, which displays a list of media objects provided by 3D compositing application 600 that can also be inserted into the 3D project. The third tab 623 is for accessing an inspector interface 625, which provides an interface of controls for adjusting each media object included in the 3D project. In the example illustrated in FIG. 6, the media object that has been chosen for adjustment using the interface of controls provided in inspector 625 is point light 650, as shown by "light" label 624. The categories of parameters provided by inspector 625 include "properties," "behaviors," "filters," and "light." In this example, the "light" category of parameters is displayed in inspector 625.

In some embodiments of the invention, 3D compositing application 600 provides project pane 630 which includes three interfaces selectable by tabs, including layers interface 631, media interface 632, and audio interface 633. Layers interface 631 displays the hierarchy of objects in the 3D project. Media interface 632 provides a list of all files imported into the 3D project. The list can be filtered to show only the objects that are visible in 3D composite display area 610. Audio interface 633 provides access to, and control of, any audio files in the 3D project. In the example as illustrated in FIG. 6, layers interface 631 is displayed showing a list of items including a light that has been turned off, a camera, a group, and within the group, a dolphins media object.

In some embodiments of the invention, 3D compositing application 600 provides heads-up display ("HUD") 640. HUD 640 is a dynamic display that dynamically changes the content it displays depending on the type of object that is selected in 3D composite display area 610. HUD 640 has a default set of parameters that are displayed for a particular type of object. The set of parameters are user-customizable to suit the user's preferences, or the parameters displayed may depend on a determination of the frequency of access by the user. In the example shown in FIG. 6, HUD 640 displays the parameters for the selected point light object that are most frequently accessed by the user. Generally, the controls and parameters displayed within HUD 640 may be accessed through another interface of the 3D compositing application 600.

As previously mentioned, in the example illustrated in FIG. 6, the "light" parameter as displayed in layers interface 631 has a checkbox 670 in the "On" column that is unchecked. As a result, while point light 650 is shown in composite display area 610, it is not emitting any light. Accordingly, the lighting that is affecting media object 660 is the default surface lighting that has been set for the object. Such lighting is uniform for the object, and changing the perspective of the camera does not affect the illumination of media object 660.

II. Visible Point Light Source Effect

The 3D compositing application of some embodiments provides tools for the user to better visualize the effects of a light in a 3D space by allowing a user to incorporate an interactive point visible light source into a 3D project. The visible point light sources that are incorporated into the 3D project can be rendered for the final composited project, or they can be interactively displayed and used only during the 3D project's compositing stage to assist the user's visualization. Interactive display presentation generation of the objects allows for any adjustments to the 3D scene to be dynamically reflected with minimal user-perceivable delay. All objects in the scene, including visible light sources, are dynamically displayed in an interactively generated display presentation. In the following examples, a visible point light is employed to illustrate the features of the invention. However, it is understood that the features of the invention can be applied to present any light source of any shape or of any light-emitting characteristic. In some embodiments, the light sources include artificial lighting sources such as a light bulb, a glowing filament, a flame from a candle or torch, a fluorescent bulb, a single or an array of light emitting diodes (LEDs), a neon tube, or a light bulb with a parabolic aluminized reflector such as a spot light. In some embodiments, light sources do not include any light-emitting celestial bodies, such as the sun or stars in the sky.

Figure 7:
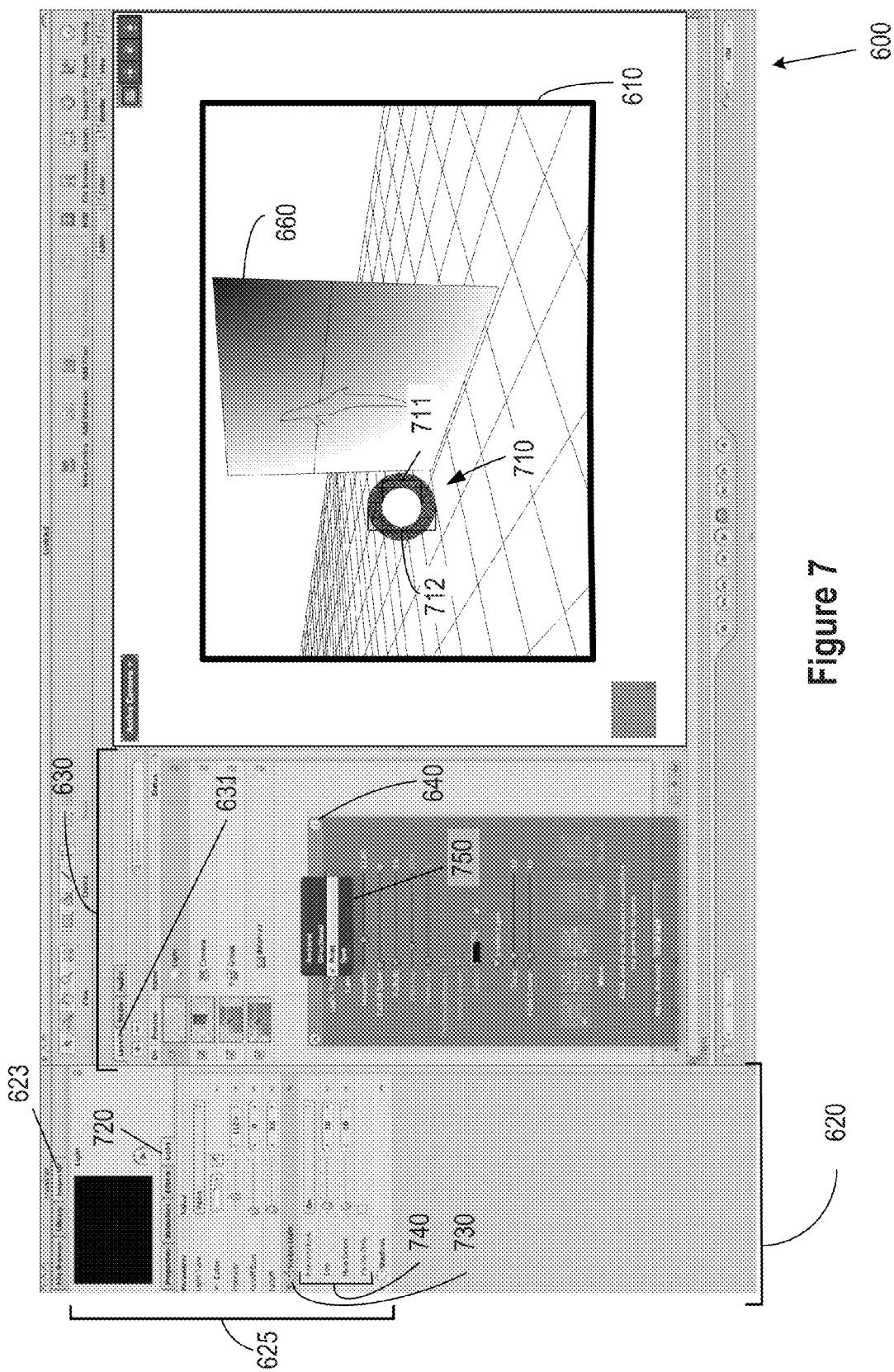
FIG. 7 illustrates a GUI of a 3D compositing application that allows a user to incorporate an interactive visible light source into a 3D project, according to some embodiments of the invention.

FIG. 7 illustrates a GUI of a 3D compositing application that allows a user to incorporate an interactive visible point light source into a 3D project. In particular, FIG. 7 shows the stage after a visible point light has been added into the 3D project. Like FIG. 6, FIG. 7 illustrates a 3D composite display area 610, a utility window 620, a project pane 630, and a heads-up display 640, as well as the inspector interface 625, and layers interface 631. FIG. 7 also illustrates visible point light 710, light parameters panel 720, visible light checkbox 730, visible light parameters 740, and light selector menu 750 included in HUD 640.

Visible point light 710 represents a point light that is inserted into the 3D space represented in 3D composite display area 610. Visible point light 710 emits light outward from a single geometric point into the 3D space in all directions, illuminating any objects within the reach of the light.

The light rays that are modeled by the 3D compositing application 600 as being emitted from visible point light 710 are affected by adjustments made to several parameters found in light parameters panel 720 when the selected object is a point light. Light parameters panel 720, shown in magnified detail in FIG. 8, includes the "Color" setting, which specifies the color of the emitted light, the "Intensity" control, which adjusts the light intensity of the emitted light, and the "Falloff Start" and the "Falloff" controls, which allow the user to adjust where and how the light rays decrease in intensity proportionally with distance. The illumination of objects that are within reach of the emitted light will accordingly change with any adjustments to these parameters.

In the example of some embodiment of the invention as shown in FIG. 7, visible point light 710 is added as a 3D object position within the 3D space by first adding point light 650 as described with reference to FIG. 6, and then turning on the visible point light source feature by checking the visible light checkbox 730. Alternatively, 3D compositing application provides for visible point light 710 to be added originally into the 3D space as a visible object. As checkbox 730 is checked, a visible point light 710 is interactively generated in the 3D composite display area 610 as a representation of a visible point light source, such as a light bulb. Accordingly, the visibility of visible point light 710 can be toggled using the checkbox 730. Visible point light 710 has a solid spherical core 711 surrounded by a semi-transparent outer layer, which appears as a halo 712 around the core.

Figure 8:
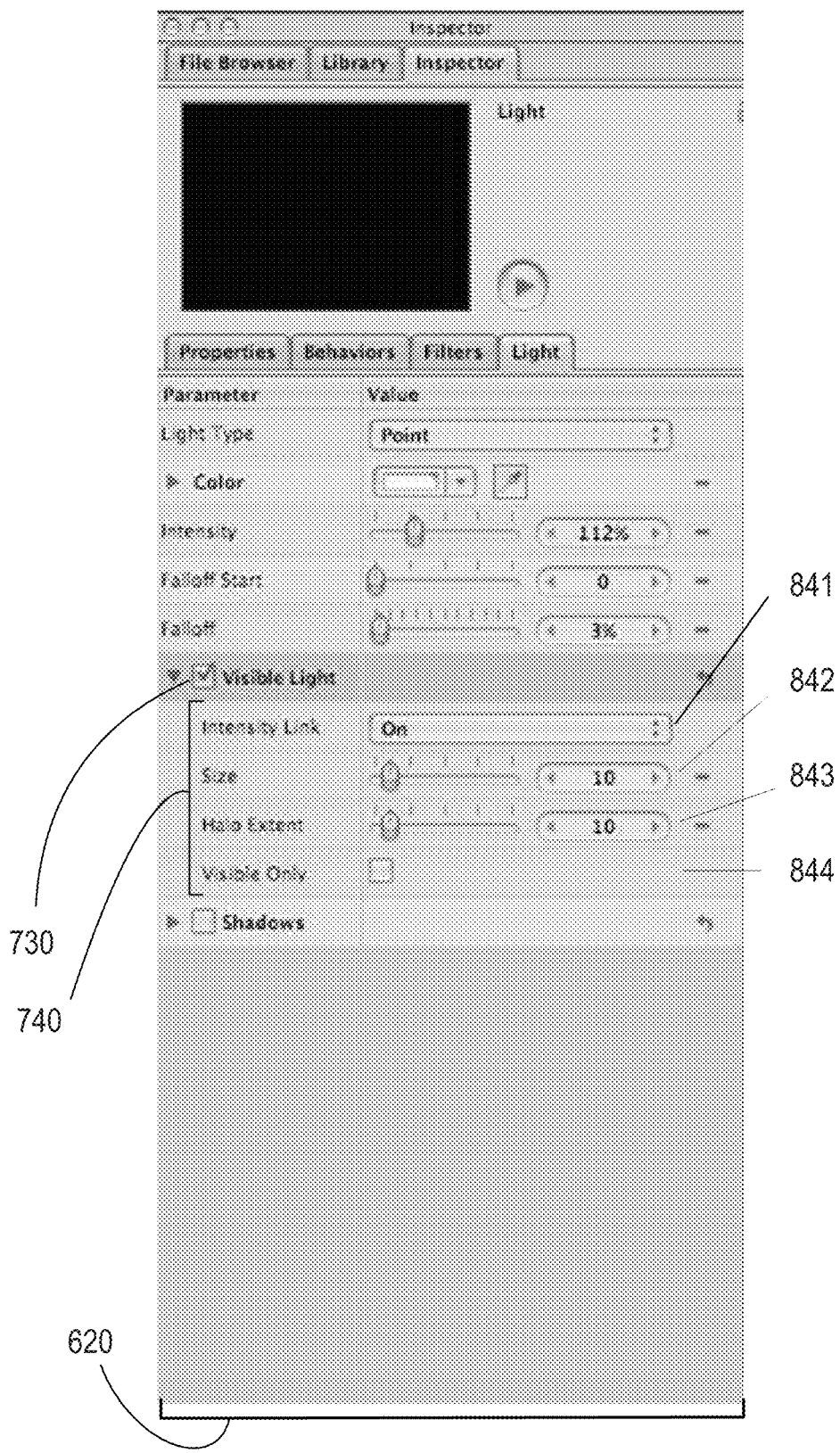
FIG. 8 illustrates a magnified view of a visible light source parameters included in the utility window, according to some embodiments of the invention.

The appearance of the visible point light 710 can be adjusted using visible light parameters 740, which are illustrated in magnified detail in FIG. 8. Visible light parameters 740 include controls for adjusting and modifying several visible point light parameters, including Intensity Link control 841, Size control 842, Halo Extent control 843 and Visible Only control 844.

The Intensity Link setting 841 specifies whether a change in the intensity parameter for the point light 650 would affect the appearance of the visible point light 710. In particular, when the Intensity Link setting is on, an increase in intensity decreases the transparency of halo 712.

The Size control 842 adjusts the diameter of the solid spherical core 711. The Halo Extent control 843 adjusts the diameter of halo 712. The Visible Only setting 844 specifies whether visible point light 710 is modeled to emit light into the 3D space, or to simply appear as a visible light source that does not emit any light into the scene. More details regarding the operation of these settings will be described below.

In some embodiments of the invention, a light that is added into the 3D project can be changed from one type of light to another type of light at any time by changing the "Light Type" parameter on either light parameters panel 720, or by using the light selector menu 750, as illustrated in FIG. 7. Although light selector menu 750 is shown as having four light types that a user may select, more light types can be provided in some embodiments of the invention.

Figure 9:
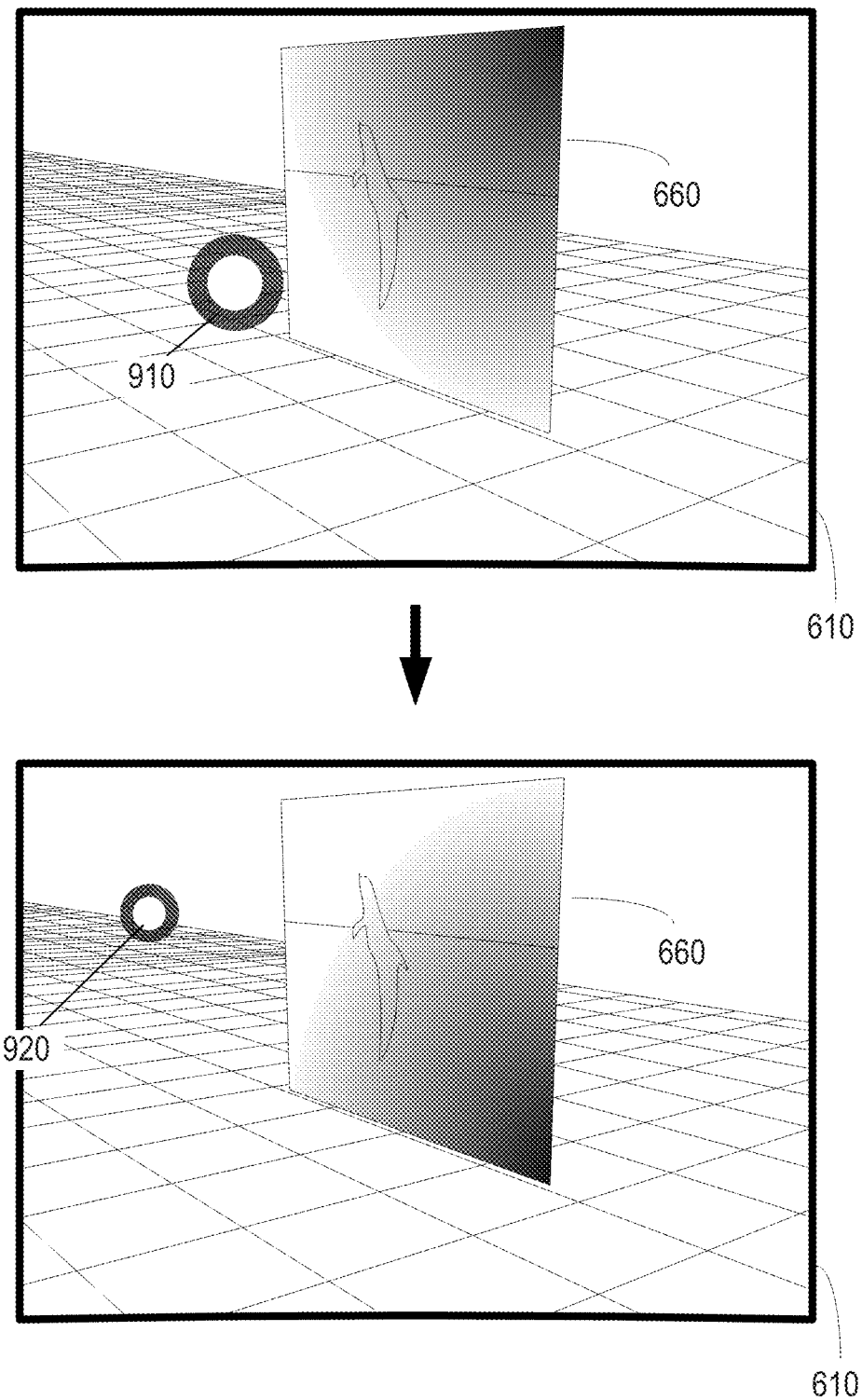
FIG. 9 illustrates the stages before and after a visible point light is moved from one position to another position, according to some embodiments of the invention.

When the visible point light is moved into a new position, as shown in FIG. 9, the 3D composite display area 610 is interactively updated to reflect the new position. Specifically, any changes in the interaction between the visible point light and the 3D space are also reflected and displayed interactively in the 3D composite display area 610. According, objects that are moved farther away appear smaller on the screen. For example, while the size of the visible point light object is unchanged, the on-screen size of the visible point light is made smaller as the light is moved from position 910 into a new position 920 because in the 3D composite display area 610's representation of a 3D space, parallel lines converge at far distances represented in the scene. The illumination of any objects in the 3D space is also changed when the visible point light is moved. In the example shown in FIG. 9, media object 660 shows illumination focused at middle-left-hand edge with a falloff as the illumination recedes with distance from the focal point.

The 3D compositing application provides that a light can be positioned anywhere within the 3D space of the 3D project. The light can be positioned by the user through the 3D composite display area by manipulating the position of the light on screen or by setting coordinates for the light. The coordinates have an X-component that specifies a location along a horizontal (or "X") axis for a scene, a Y-component that specifies a location along a vertical (or "Y") axis for a scene, and a Z-component that specifies a location along a depth (or "Z") axis for the scene. Each location within the 3D space can be defined by a set of coordinates including one of each of the X-, Y-, and Z-components. A movement of the light can affect any single one of the X-, Y-, or Z-components individually.

Figure 10:
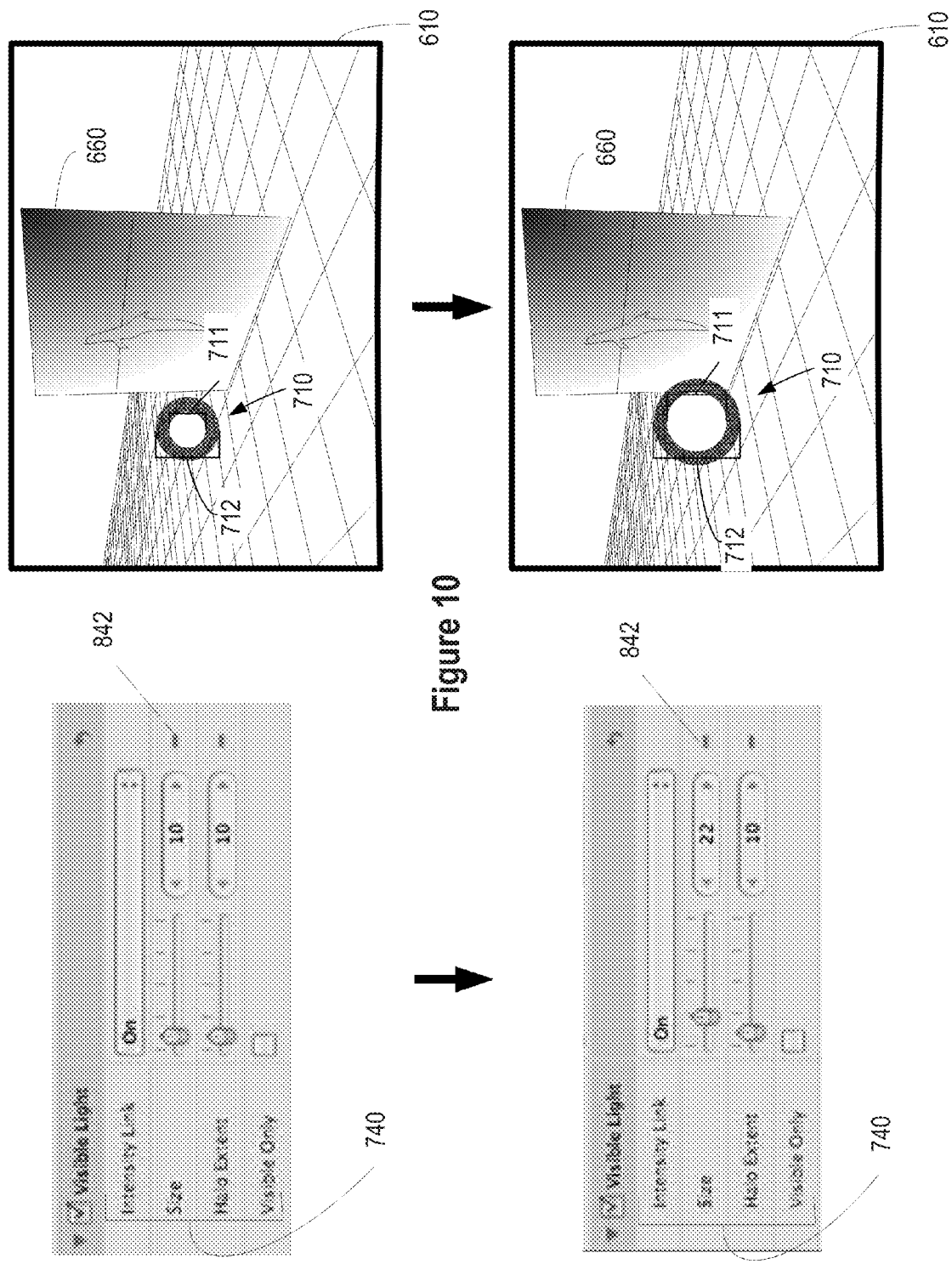
FIG. 10 illustrates the stages before and after when size of the inner solid spherical core of a visible point light is changed, according to some embodiments of the invention.

As mentioned in the prior sections, the dimensions of the visible point light source can be interactively adjusted using the controls provided in the utility window 620. As shown in the example illustrated in FIG. 10, the size of the inner solid spherical shape 711 of visible point light 710 is increased using the size control 842 that is included among visible light parameters 740. The size of inner solid spherical shape 711 is increased from 10 to 22 units in the size scale of one example of some embodiments of the invention as illustrated in FIG. 10. In some embodiments, a change in size of inner solid spherical shape 711 does not change the length of halo 712, and does not affect the intensity of the light emitted from visible point light 730.

Figure 11:
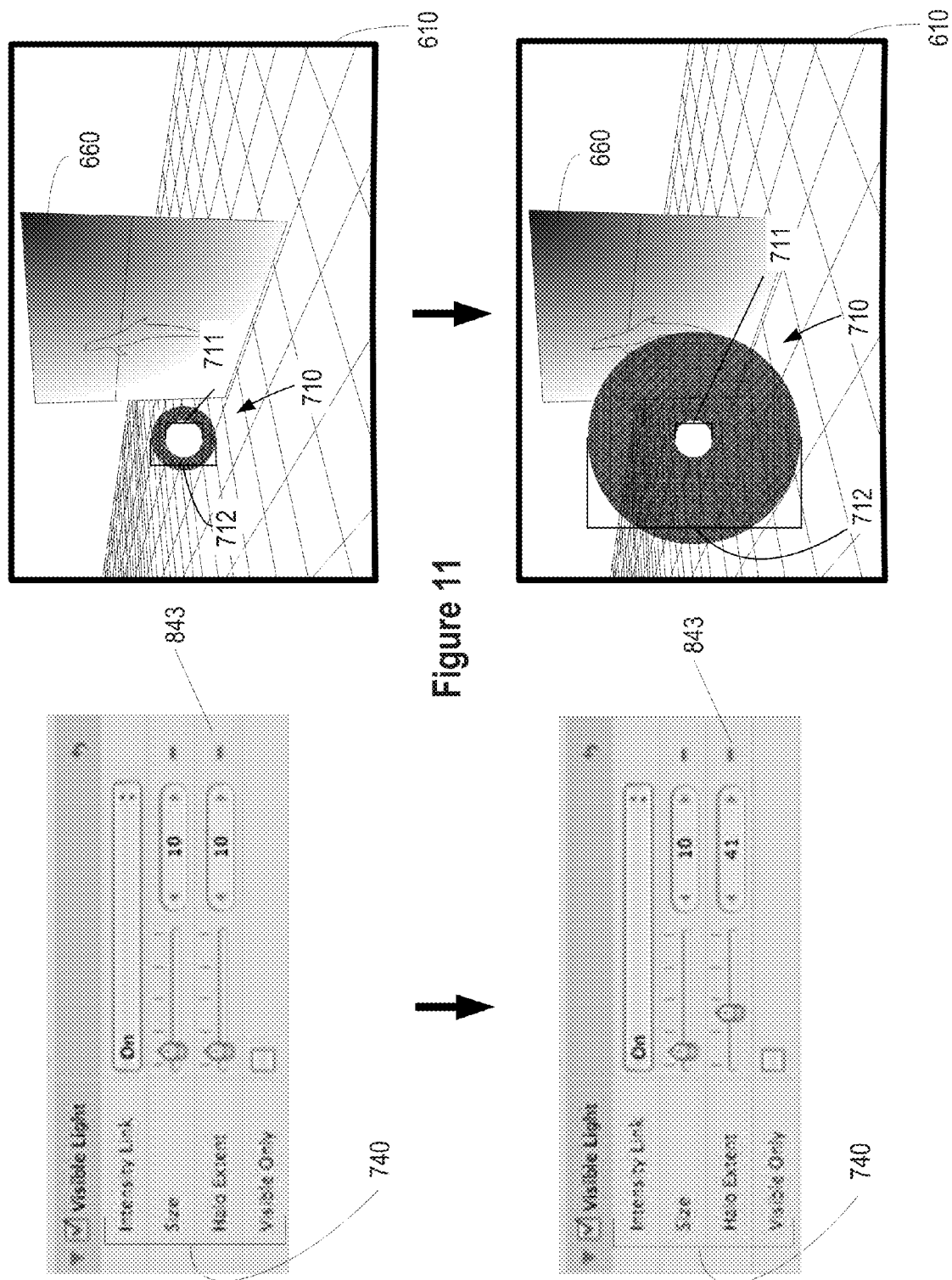
FIG. 11 illustrates the stages before and after when the extent of a halo of a visible point light is changed, according to some embodiments of the invention.

As shown in the example illustrated in FIG. 11, the extent of halo 712 is increased using the Halo Extent control 843 that is included among visible light parameters 740. The extent of halo 712 is increased from 10 to 41 units in the halo extent scale of one example of some embodiments of the invention as illustrated in FIG. 11. In some embodiments, a change in size of halo 712 does not change the relative size of inner solid spherical shape 711.

While the media object may appear to receive more illumination because volume of light presented by halo 712 is superimposed over the media object 660, as shown in this particular camera perspective, the portion of halo 712 that is superimposed over media object 660 does not add to the illumination received by media object 660. Accordingly, if the camera perspective is changed such that halo 712 is not shown as superimposed over media object 660 in the view, adjustments made to the size of halo 712 will not appear to affect the surface luminosity of media object 650.

III. Visible Spot Light Source Effect

In addition to allowing a user to incorporate an interactive visible point light source into a 3D project, the 3D compositing application also allows a user to incorporate an interactive visible spot light source into the 3D project. Like the visible point light source, the visible spot light sources can be rendered objects for the final composited project, or they can be displayed and used only during the 3D project's compositing stage to assist the user's visualization. Interactive display presentation generation of the objects allows for any adjustments to the 3D scene to be dynamically displayed with minimal user-perceivable delay.

In the following examples, a spot light volume is employed as a model of a visible spot light source to illustrate the features of the invention. However, it is understood that the features of the invention can be applied to any visible spot light source generated from any light source of any shape or of any variation of light-emitting characteristic. In some embodiments, the light sources include artificial light sources such as a frosted light bulb or globe, a glowing filament, a flame from a candle or torch, a fluorescent bulb, a single or an array of light emitting diodes (LEDs), or a neon tube, that is placed within a parabolic or conical aluminized reflector, or a light-emitting source surrounded and obscured from view by an opaque shade, such as an incandescent light bulb inside an opaque lamp shade. In some embodiments, light sources do not include any light-emitting celestial bodies, such as the sun or stars in the sky.

Figure 12:
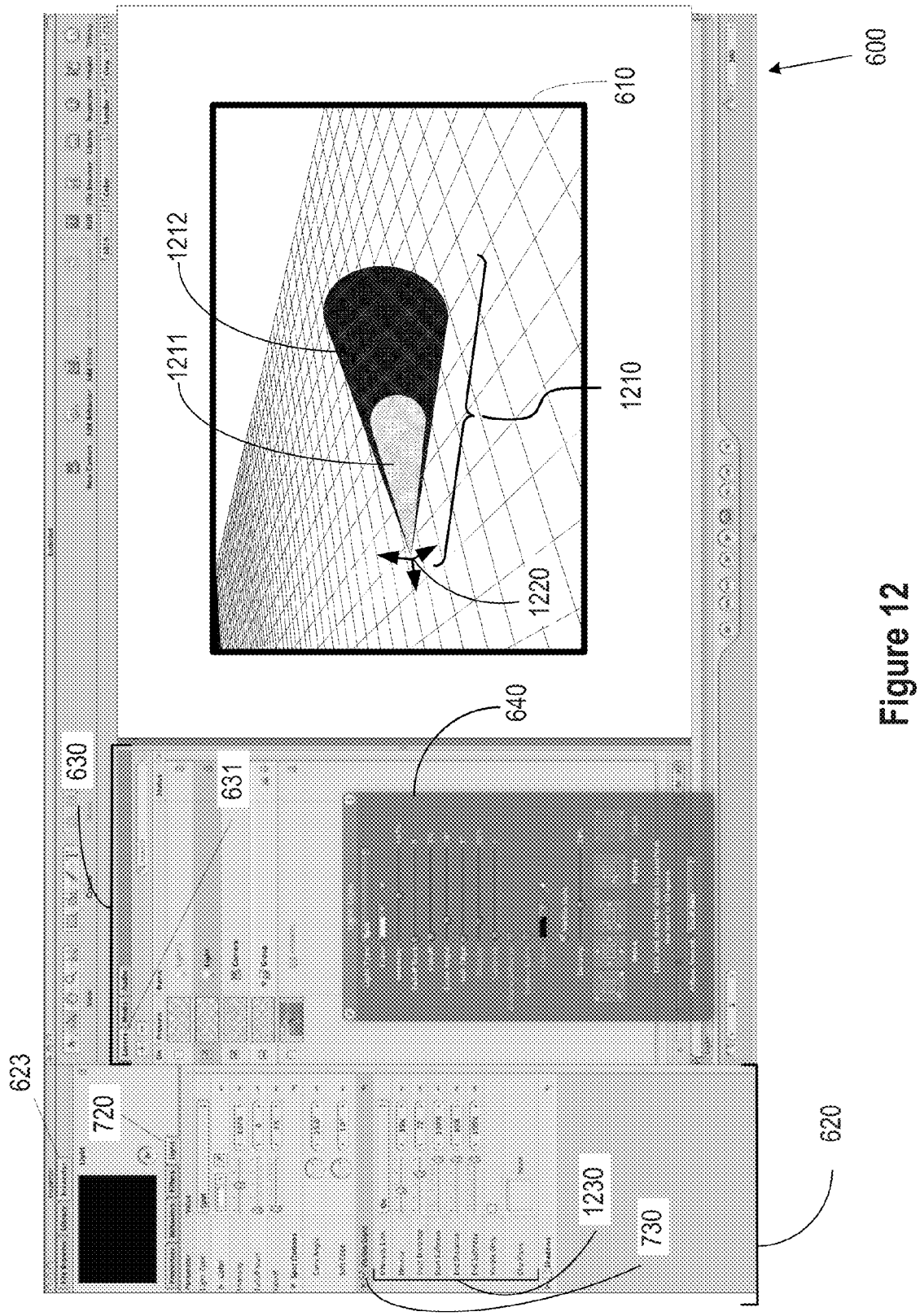
FIG. 12 illustrates a GUI of a 3D compositing application that allows a user to incorporate an interactive visible light source into a 3D project, according to some embodiments of the invention.

FIG. 12 illustrates a GUI of a compositing application 600 that allows a user to incorporate an interactive visible spot light source, such as a visible spot light volume, into a 3D project. In particular, FIG. 12 illustrates the stage after a spot light with a visible spot light volume has been added into the 3D composition, as presented in 3D composite display area 610. Like FIG. 6-7, FIG. 12 illustrates the 3D composite display area 610, the utility window 620, the project pane 630, the heads-up display 640, the inspector interface 625, layers interface 631, light parameters panel 720, and visible light checkbox 730. FIG. 12 also illustrates visible spot light volume 1210, spot light 1220, and visible spot light volume parameters 1230.

Visible spot light volume 1210 represents the volume of light rays that are made visible when a spot light (such as a flash light or a light projector) 1220 is inserted into the 3D space represented in 3D composite display area 610. Visible spot light volume 1210 is shown as a semi-transparent image that represents a conical beam (or volume) of light shining through the 3D space as if the 3D space contained a distribution of particles with refractive and reflective properties that intersect the light rays to make the light rays visible as a beam. In some embodiments, the spot light 1220 is modeled as a geometric point indicated by the set of axes for spot light 1220 as presented in 3D composite display area 610 of FIG. 12, and is radiating out in a conical pattern. As shown, because spot light 1220 is a geometric point and is not displayable as a volume, only visible spot light volume 1210 is displayed. Some embodiments of the invention may display an interactive spot light source in addition to displaying the light volume.

In some embodiments of the invention, the spot light is composed of a geometric point light, emitting light in all directions, that is positioned at the apex of an imaginary open-based cone with a reflective interior. Accordingly, in these embodiments and as shown in FIG. 12, spot light volume 1210 appears to have an inner volume (or spot umbra) 1211 that is brighter than the outer volume (or spot penumbra) 1212. In some embodiments, the brightness is shown as receding to the edges of the cone due to a fall off in intensity of the light rays, and due to fewer light rays overlapping in the light volume.

When the camera perspective through which the 3D space is presented in the 3D composite display area 610 is changed, visible spot light volume 1210 is likewise changed in real-time to reflect the change in camera perspective. For instance, when the camera angle is rotated to view the visible spot light volume 1210 from a position directly in front of the wide end of the cone, the visible spot light volume 1210 will be displayed as a circle.

In some embodiments, many visible spot light volumes may be added to the 3D space. These visible spot light volumes may interact with each other and with other objects dispersed in the 3D space. When portions of different light volumes occupy the same space, the presentation of the visible spot light volumes as displayed in 3D composite display area 610 illustrate the physical interaction among the light rays of the visible spot light volumes as they would in the real physical world. For example, in the portions where the visible spot light volumes intersect, the intensity within the intersecting volume would appear as the sum of the intensities of each individual visible spot light volume.

The light rays that are modeled by the 3D compositing application 600 as being emitted from spot light 1220 are affected by adjustments made to several parameters found in light parameters panel 720. Light parameters panel 720, in the view as illustrated in magnified detail in FIG. 13, includes the "Color" setting, which specifies the color of the emitted light, the "Intensity" control, which adjusts the light intensity of the emitted light, "Falloff Start" and the "Falloff" controls, which allow the user to adjust where and how the light rays decrease in intensity proportionally with distance. The illumination of objects that are within reach of the emitted light will accordingly change with any adjustments to these parameters. Light parameters panel 720 additionally includes two controls specific to the spot light: the "Cone Angle" control 1341 and the "Soft Edge" (or spot penumbra angle) control 1342. The "Cone Angle" control 1341 specifies the width of the angular span of the spot light. The "Soft Edge" control 1342 specifies how the edges of the visible spot light volume 1210 are interactively generated for the display presentation. A small value results in a sharp transition between the visible spot light volume 1210 and the background. A large value results in a gradual fade between the visible spot light volume 1210 and the background. The "Soft Edge" control 1342, when adjusted, effectively changes the width of the outer volume 1212 of visible spot light 1210.

Figure 13:
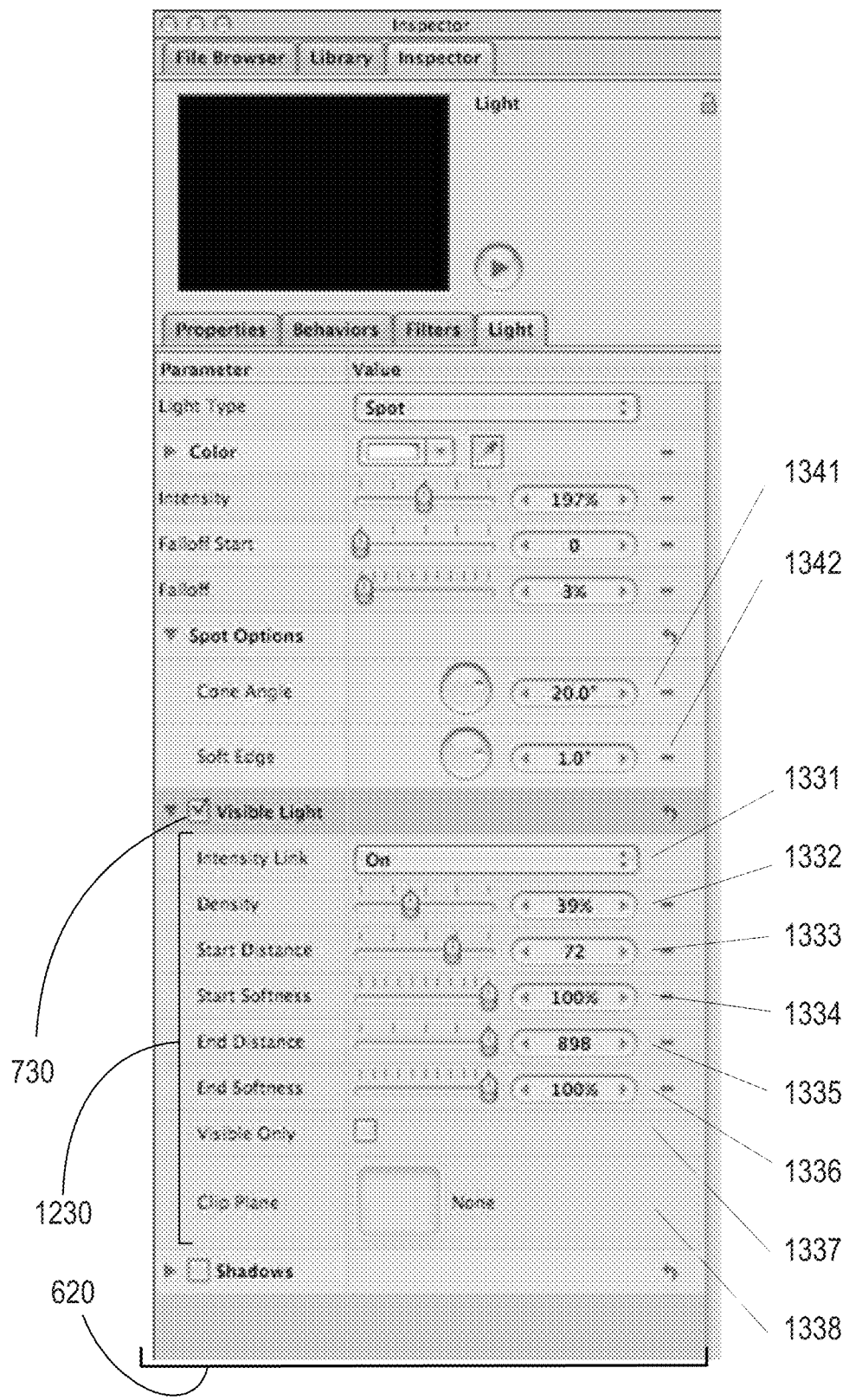
FIG. 13 illustrates a magnified view of the visible spot light volume parameters included in the utility window, according to some embodiments of the invention.

The appearance of visible spot light volume 1210 can be adjusted using visible spot light volume parameters 1230, which are presented in the light parameters panel 720 when the media object that is selected for adjustment is a spot light. The light parameters panel 720, as illustrated in magnified detail in FIG. 13, presents visible spot light volume parameters 1230, which include controls for adjusting and modifying several visible spot light volume parameters. These controls include Intensity Link control 1331, Density control 1332, Start Distance control 1333, Start Softness control 1334, End Distance control 1335, End Softness control 1336, Visible Only control 1337, and Clip Plane control 1338.

The Intensity Link control 1331 specifies whether a change in the intensity parameter for the spot light 1220 as shown in FIG. 12, would affect the appearance of visible spot light volume 1210. In particular, when the Intensity Link setting is set to On, an increase in intensity decreases the transparency of visible spot light volume 1210. Visible Only control 1337 specifies whether the emitted light from visible spot light volume 1210 is modeled to cast any surface light onto other objects in the 3D space, or whether the visible spot light volume 1210 simply appears as a visible volume that does not produce any surface incident light. More details regarding the operation of the other settings and controls will be described below.

In the example as illustrated in FIG. 12, when a spot light has been selected for editing, the content displayed in HUD 640 is modified accordingly to reflect the spot light selection. In particular, in contrast with HUD 640 as shown in FIG. 7, HUD 640 as shown in FIG. 12 shows controls applicable to a spot light, including Cone Angle, Soft Edge, and Density.

The visible spot light volume 1210 has a density parameter that specifies the density of the simulated atmosphere inside the visible spot light volume 1210. The simulated atmosphere is modeled as being composed of particles which reflect and refract the light rays as they travel through a 3D space. In some embodiments of the invention, the simulated atmosphere is a property of the particular visible spot light volume 1210. The simulated atmosphere within visible spot light volume 1210 is individually controllable.

Figure 14:
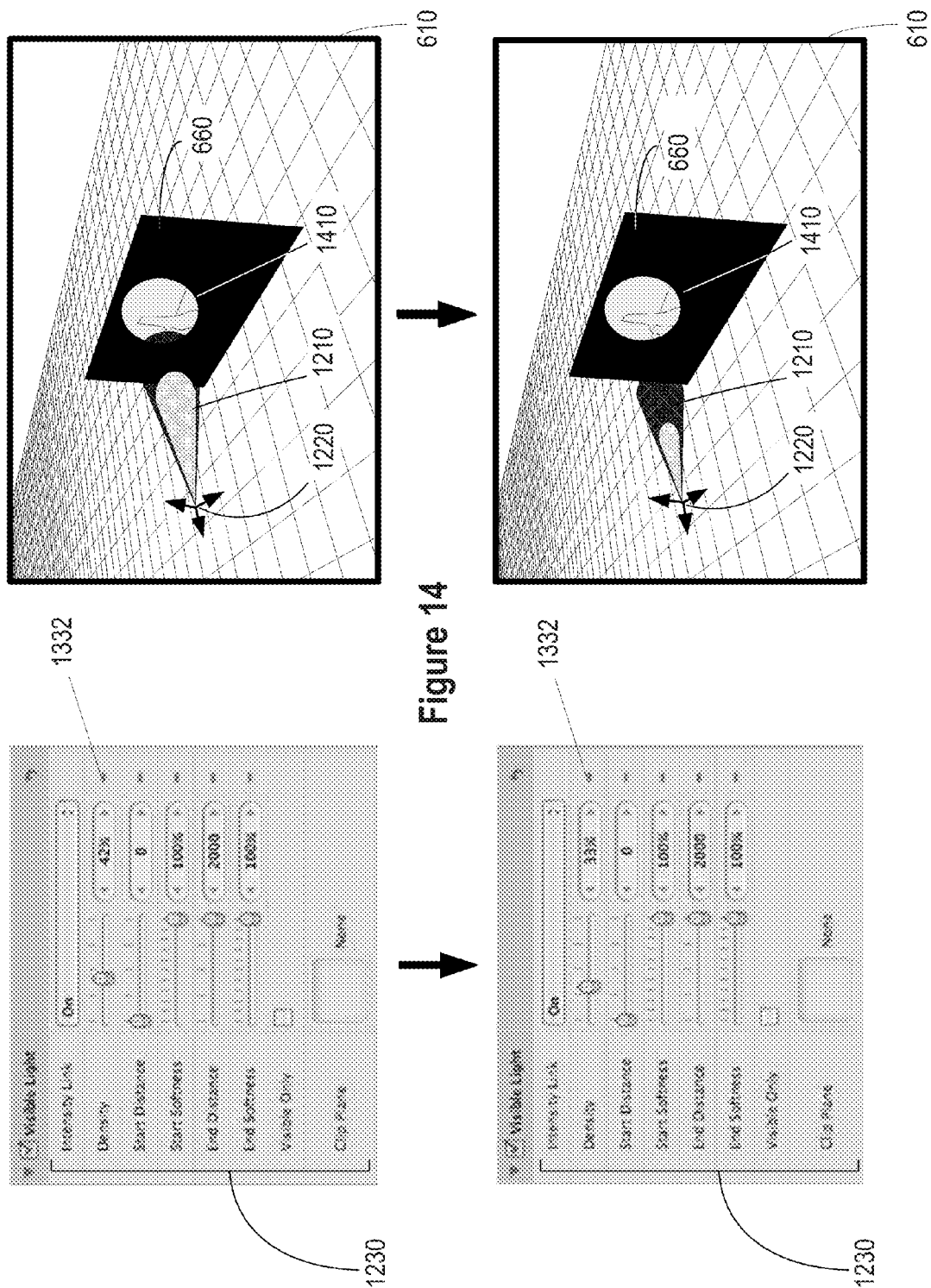
FIG. 14 illustrates the effect of changing the density parameter of the visible light controls provided in the utility window for spot light, according to some embodiments of the invention.

The density parameter can be modified by changing density control 1332 included among visible spot light volume parameters 1230. In the example as illustrated in FIG. 14, the density of the visible spot light volume 1210 is decreased using density control 1332. In this example, the density is decreased from 42% to 33%. The change in density is displayed in the interactively generated display presentation of visible spot light volume 1220 as a change in the semi-transparency and/or a change in the brightness of visible spot light volume 1220.

Change to the density parameter of visible spot light volume 1210 does not change the illumination of media object 660, as illustrated in FIG. 14. However, the elliptical illumination pattern 1410 may appear brighter when a portion of visible spot light volume 1210 is superimposed over elliptical illumination pattern 1410. The superimposed areas combine the luminosity of the surface lighting on media object 660 with the luminosity of visible spot light volume 1210. Accordingly, the combination of the luminosity of the visible spot light volume 1210 and the surface lighting results in the appearance of a brighter elliptical illumination pattern 1410.

Visible spot light volume 1210 is generally shaped as a cone, with an apex and a base end. In some embodiments, if the visible spot light volume 1210 does not extend continuously to a surface, the base end of the cone may appear with a base end that gradually fades into the background instead of a base end that abruptly ends. Likewise, the apex may also be adjusted to appear truncated and faded.

Figure 15:
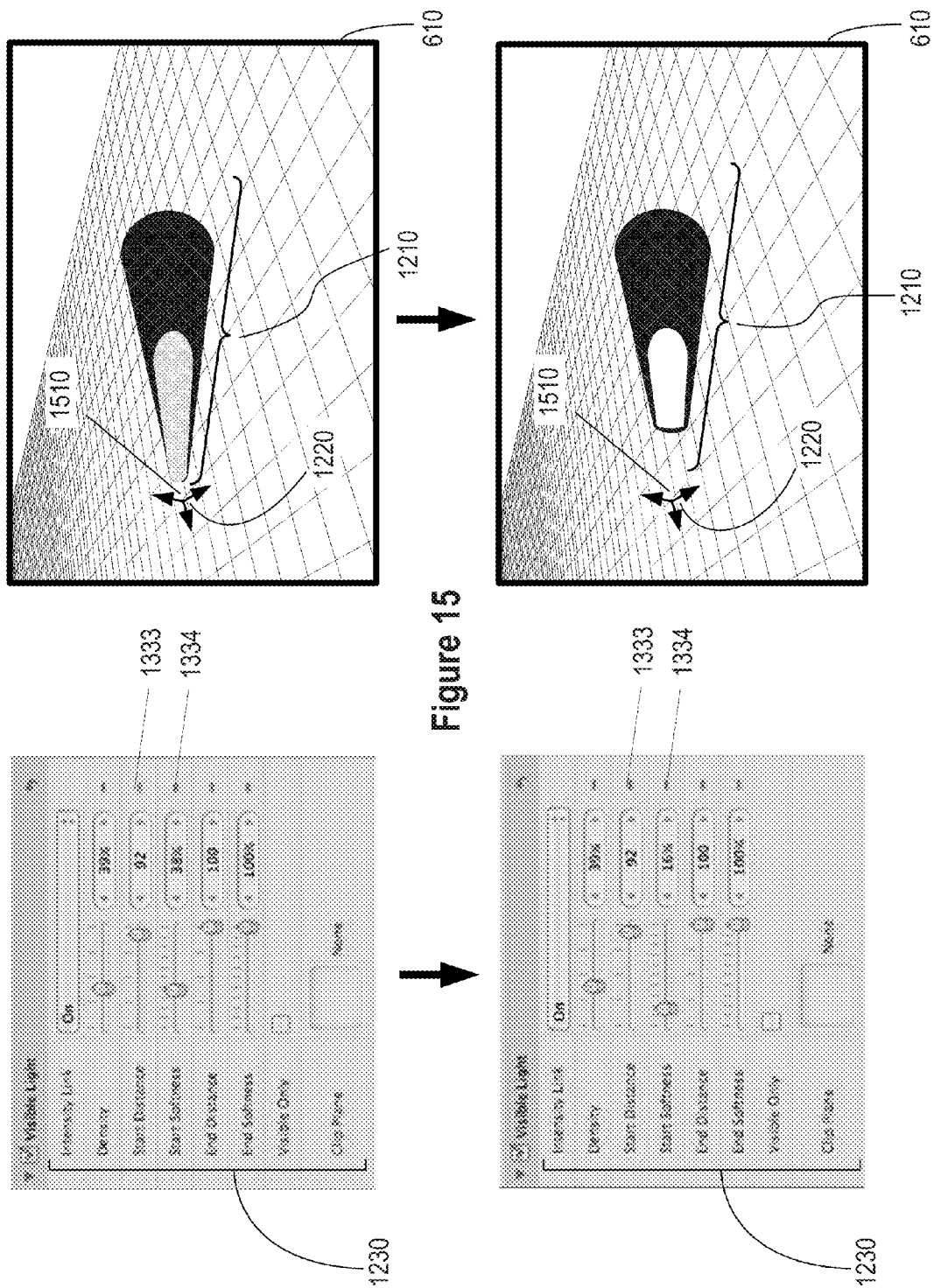
FIG. 15 illustrates the effect of changing the start softness parameter of the visible spot light volume controls provided in the utility window for spot light, according to some embodiments of the invention.
Figure 16:
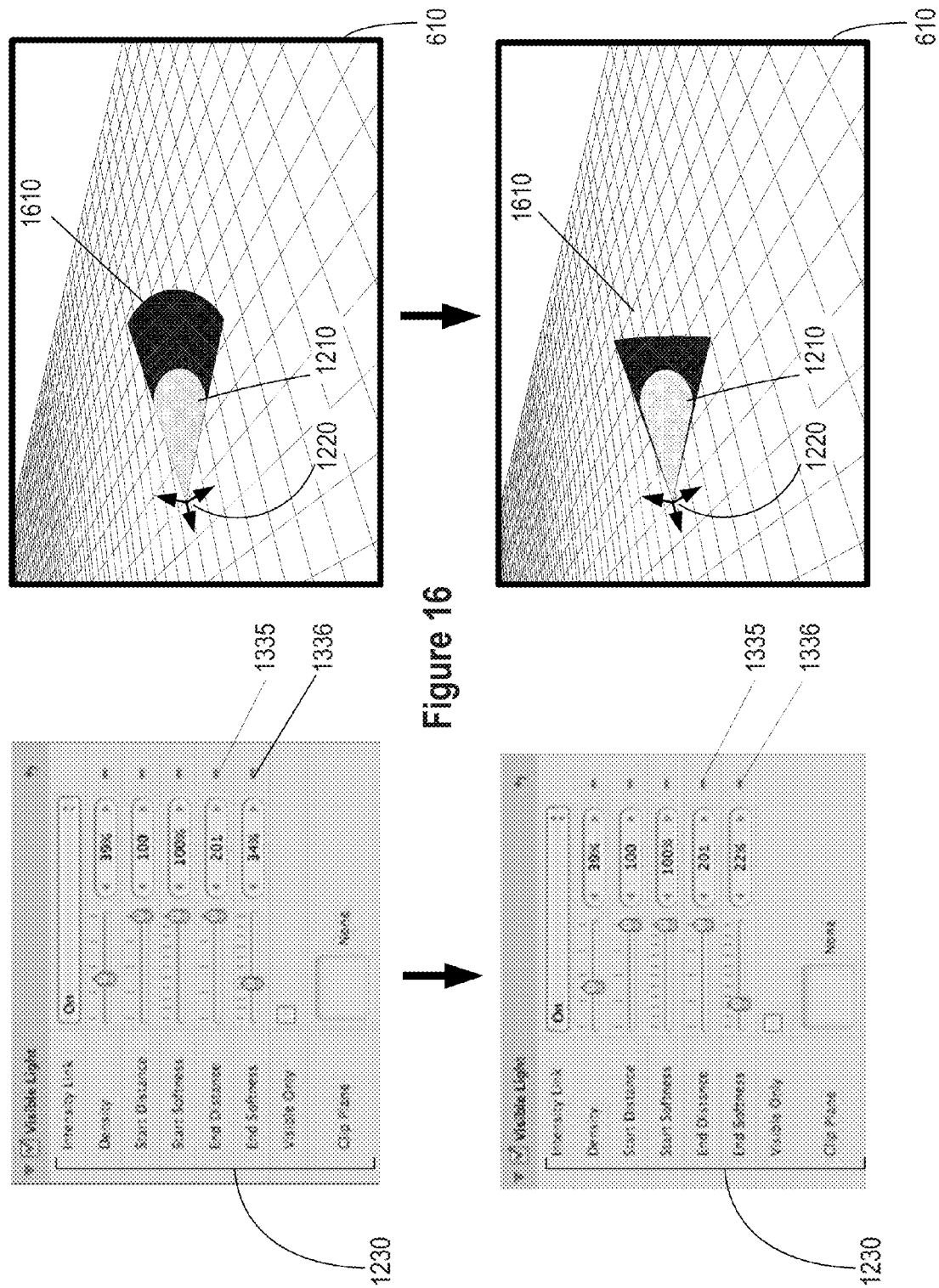
FIG. 16 illustrates the effect of changing the end softness parameter of the visible spot light volume controls provided in the utility window for spot light, according to some embodiments of the invention.

Start softness control 1334 in conjunction with start distance control 1333, as shown in the example illustrated in FIG. 15, or end softness control 1336, in conjunction with end distance control 1335, as shown in the example illustrated in FIG. 16, are used to control the truncation and fading of the apex and base end, respectively, of visible spot light volume 1210.

Referring to FIG. 15, start distance control 1333 sets the farthest start point from apex 1510 starting for visible light volume 1210 when start softness control 1334 is set to provide no softness to the start of the shape. In the example as shown in FIG. 15, start distance is set to 92 units from apex 1510. This signifies that without any start softness (i.e. with start softness set to 0%), the visible spot light volume 1210 would be truncated to start at the distance of 92 units from apex 1510. A soft extent can be added to the start of visible spot light volume 1210 by adjusting the start softness control 1334. The start softness control 1334 specifies a percentage of the truncated distance that the soft extent occupies. The example in FIG. 15 shows the difference between setting the start softness control 1334 at 38% as compared with 16%. At 38%, more of the soft extent is added, and at 16%, less of the soft extent is added.

A similar effect is provided to control the truncation and fading of the base end 1610 in the example as shown in FIG. 16. End distance control 1335 sets the closest end point for the base at which the visible light volume 1210 is truncated. A soft extent can be added to the end of visible spot light volume 1210 by adjusting the end softness control 1336. In the example in FIG. 16, the end distance is set to 201 units from apex 1510. If the end distance is set to a number that exceeds the distance of the natural fade of the full shape of visible spot light volume 1210, then the end distance and end softness settings have no effect on the shape. The example in FIG. 16 shows the difference between setting the end softness control 1336 at 34% as compared with 16%. At 34%, more of a soft extent is added, and at 22%, less of the soft extent is added.

When the visible spot light volume intersects with a two-dimensional object that is inserted in the 3D space, the visible spot light volume appears to shine through the two-dimensional object. In some embodiments, the compositing application provides a clip plane control 1338, as shown in FIG. 17, for the spot light for clipping the light at a particular plane inserted into the 3D space to generate the effect of stopping the light volume from shining through a defined plane.

Figure 17:
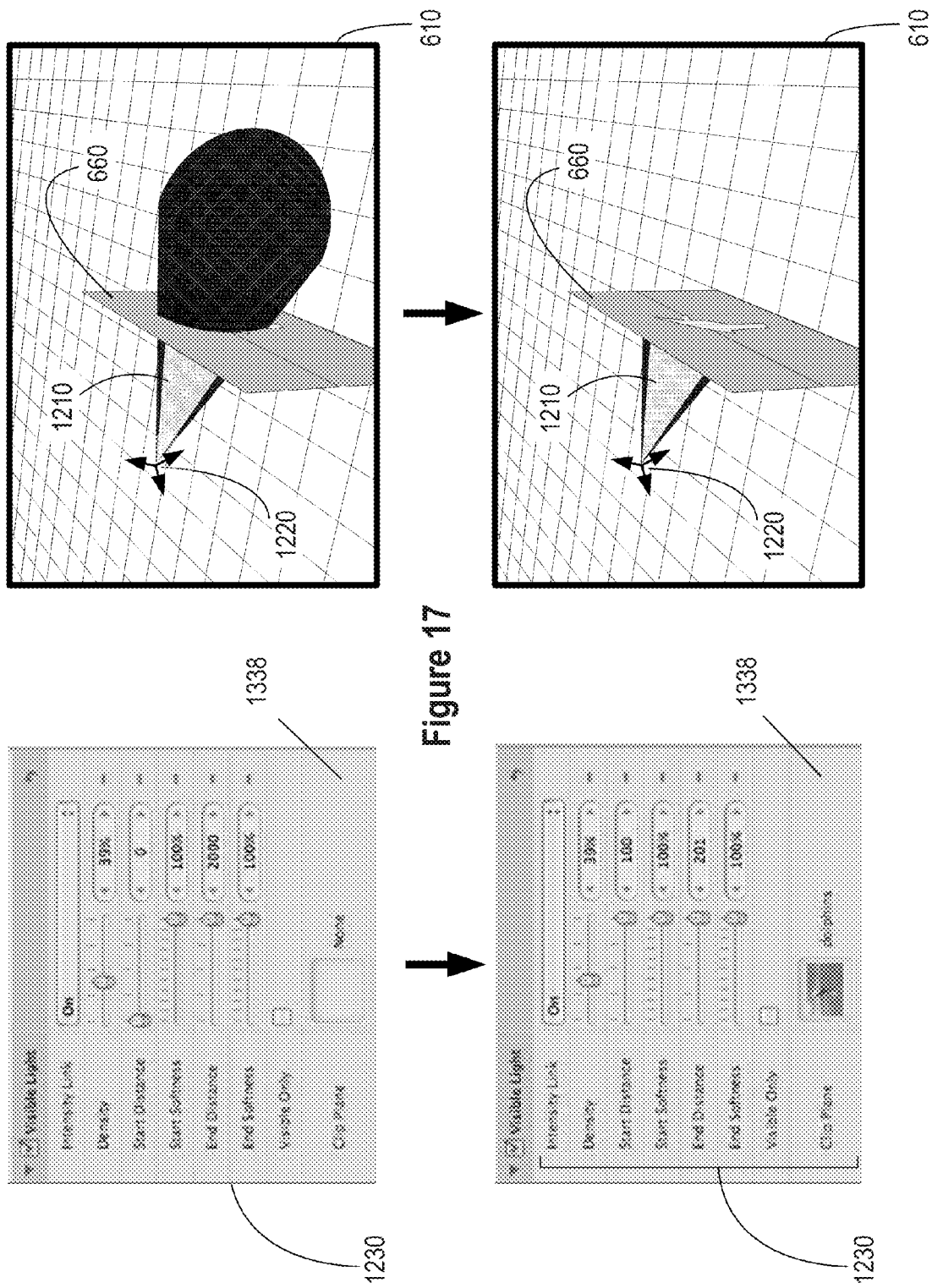
FIG. 17 illustrates the effect of specifying a value for the clip plane parameter of the visible spot light volume controls provided in the utility window for spot light, according to some embodiments of the invention.

FIG. 17 illustrates the effect of specifying a value for the clip plane control 1338 of the visible spot light volume controls 1230 provided in the utility window 620 for spot light 1220. When no value is specified for clip plane control 1338, visible spot light volume 1210 appears to shine though media object 660. When clip plane control 1338 specifies media object 660 (indicated as "dolphins") as a value, then visible spot light volume 1210 is truncated at the plane where the media object 660 is located. In the example in FIG. 17, 3D compositing application 610 would display visible spot light volume 1210 as truncated at the plane where the media object 660 is located regardless of the camera perspective at which the 3D space is presented, and regardless of changes to the position of media object 660.

Figure 18:
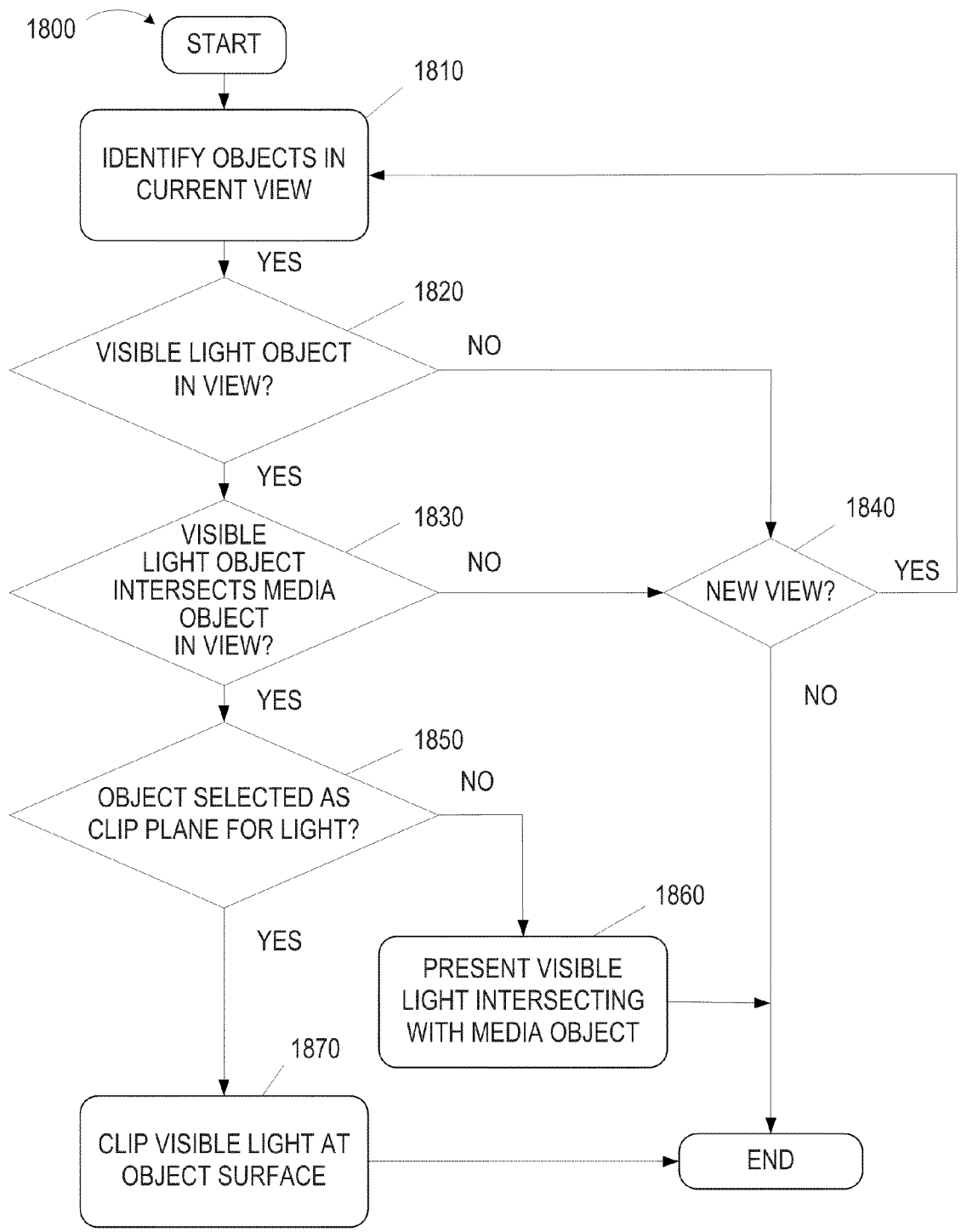
FIG. 18 illustrates an example of a conceptual machine-executed process for determining how 3D compositing application presents visible spot light volume depending on whether a clip plane parameter is specified for clip plane control, as discussed above with reference to FIG. 17.

FIG. 18 illustrates an example of a conceptual machine-executed process 1800 for determining how 3D compositing application 600 presents visible spot light volume 1210 depending on whether a clip plane parameter is specified for clip plane control 1338. The process is a conceptual representation of the operations that are performed by 3D compositing application 600 in interactively generating a display presentation of the objects. The specific operations of the process may not be performed in the exact order described. The specific operations may not be performed in one continuous series of operations. Different specific operations may be performed in different embodiments. Furthermore, the process could be implemented using several sub-processes, or as part of a larger macro-process.

As shown, the process 1800 identifies (at 1810) objects that are in the current view of the 3D space of a 3D project as presented in an 3D composite display area of a 3D compositing application. The process determines (at 1820) whether a visible light source, such as a visible spot light volume, is visible in the current view. When the visible spot light volume is not visible in the current view, the process proceeds to 1840, which is described below. Otherwise, the process determines (at 1830) whether the visible light source intersects with any media object in the view. When the visible light source does not intersect with any media object in the view, the process proceeds to 1840, which is described below. Otherwise, the process then determines (at 1850) whether the object is selected as a clip plane for the visible light source. If so, then the process clips (at 1870) visible light at the object's surface. The process then ends. Otherwise, the process presents (at 1860) the visible light source as intersecting with the media object. The process then ends.

When the process determines (at 1820) that there is not any visible light source in the view, or determines (at 1830) that visible light source in the view do not intersect with any media object in the view, the process determines (at 1840) whether there is a new view presented in the 3D composite display area of the 3D compositing application. A new view can be caused by any changes to the composition of the objects in the 3D space from the same camera perspective, or can be caused by setting a different camera perspective. When a new view is presented the process proceeds to 1810, which is describe above. Otherwise, the process ends.

Figure 19:
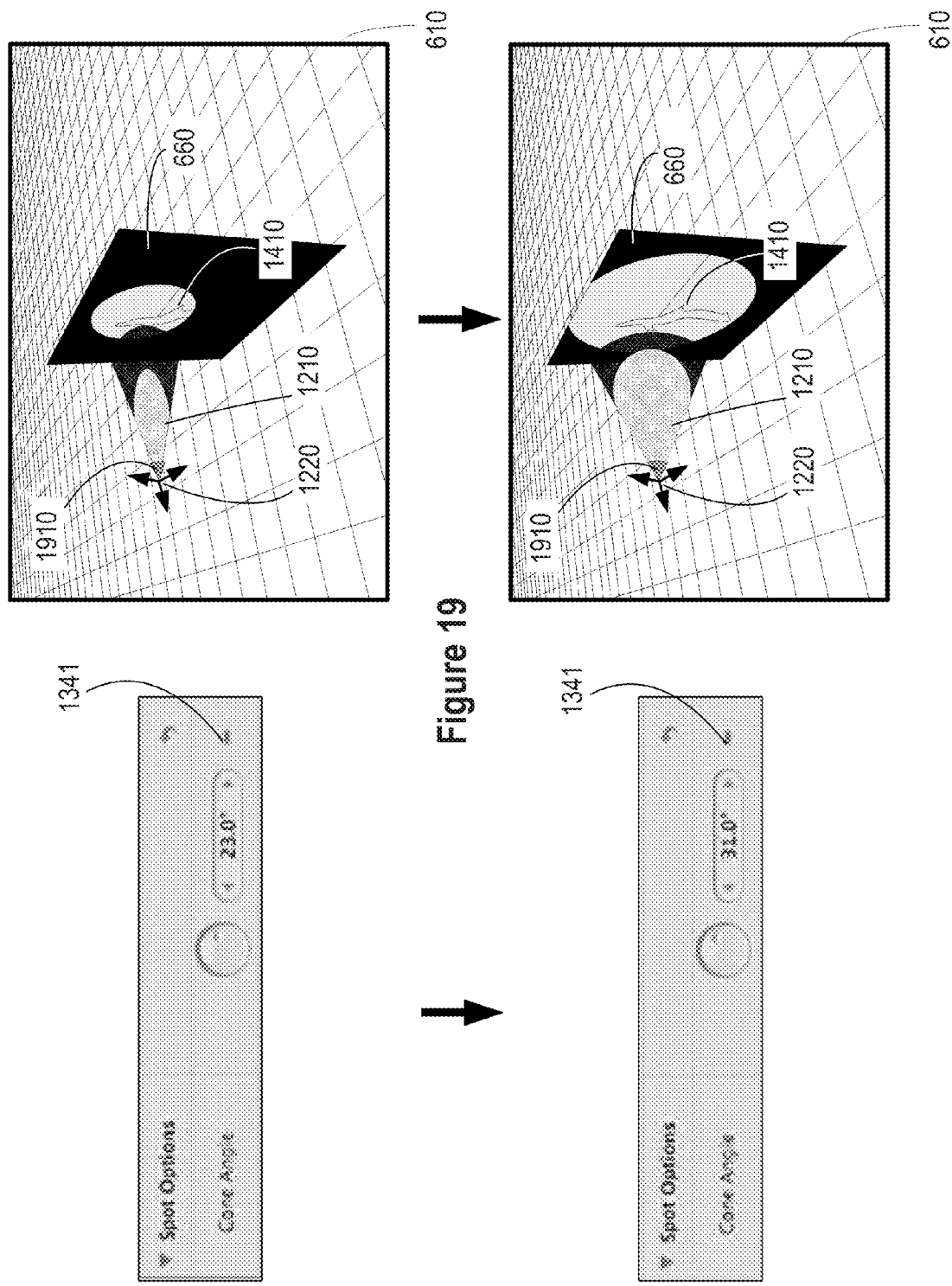
FIG. 19 illustrates the stages before and after the angle of the cone is changed by an on-screen control from one angle to another angle, according to some embodiments of the invention.

The width of visible spot light volume 1210 can also be adjusted. Changes to the width of visible spot light volume 1210 affects the width of elliptical light pattern 1410 cast onto objects by spot light 1220. As shown in the example illustrated in FIG. 19, the angular width of visible spot light volume 1210 is changed from 23.0° to 31.0°. As shown, the elliptical light pattern 1410 is also widened accordingly. In some embodiments, the width is adjusted by using Cone Angle control 1341. Alternatively, the width is adjusted by changing the angle of visible spot light volume 1210 by manipulating cone icon 1910. In some embodiments of the invention, a user can use a pointing device (e.g., a mouse, touchpad, trackball, etc.) to perform a click-and-drag operation at the edges of cone icon 1910 to adjust its width.

Figure 20:
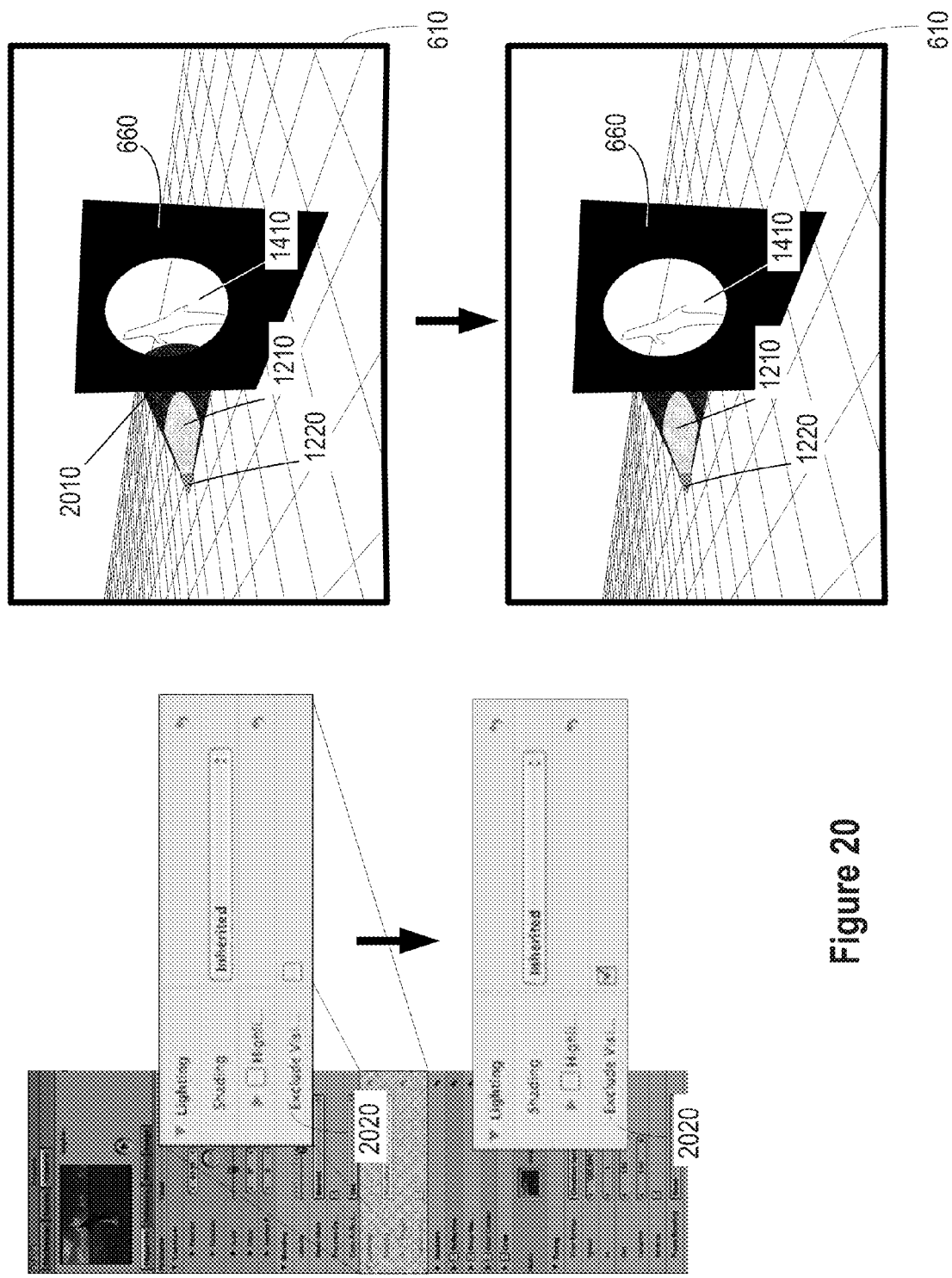
FIG. 20 illustrates the effect of changing the "exclude visible" parameter on a non-light object in the 3D space, according to some embodiments of the invention.

Each object in the 3D space is associated with a parameter for controlling whether the interactively generated display presentation for the object is generated with the visible spot light volume. FIG. 20 illustrates the effect of changing the Exclude Visible control 2020 on an object in the 3D space. In the example illustrated in FIG. 20, spot light 1220 with visible spot light volume 1210 is positioned in 3D space such that a portion 2010 of visible spot light volume 1210 is in front media object 660, as viewed from the camera perspective presented in FIG. 20. When Exclude Visible control 2020 is checked, portion 2010 no longer appears superimposed over media object 660 in the view.

The Exclude Visible control 2020 is a parameter that is included among the media object 660's parameters. Accordingly, all visible light sources, including any visible point light source or any visible spot light volume, will not be presented as superimposed over media object 660, even if the relative positioning of the visible light source is in front of the media object 660 for a particular view.

The Exclude Visible control 2020 does not affect the illumination of the surface of media object 660. Only the display of the visible light sources is affected. Accordingly, as shown by elliptical pattern 1410, spot light 1220 is casting light and onto the surface of media object 660 when the Exclude visible control 2020 is checked.

Figure 21:
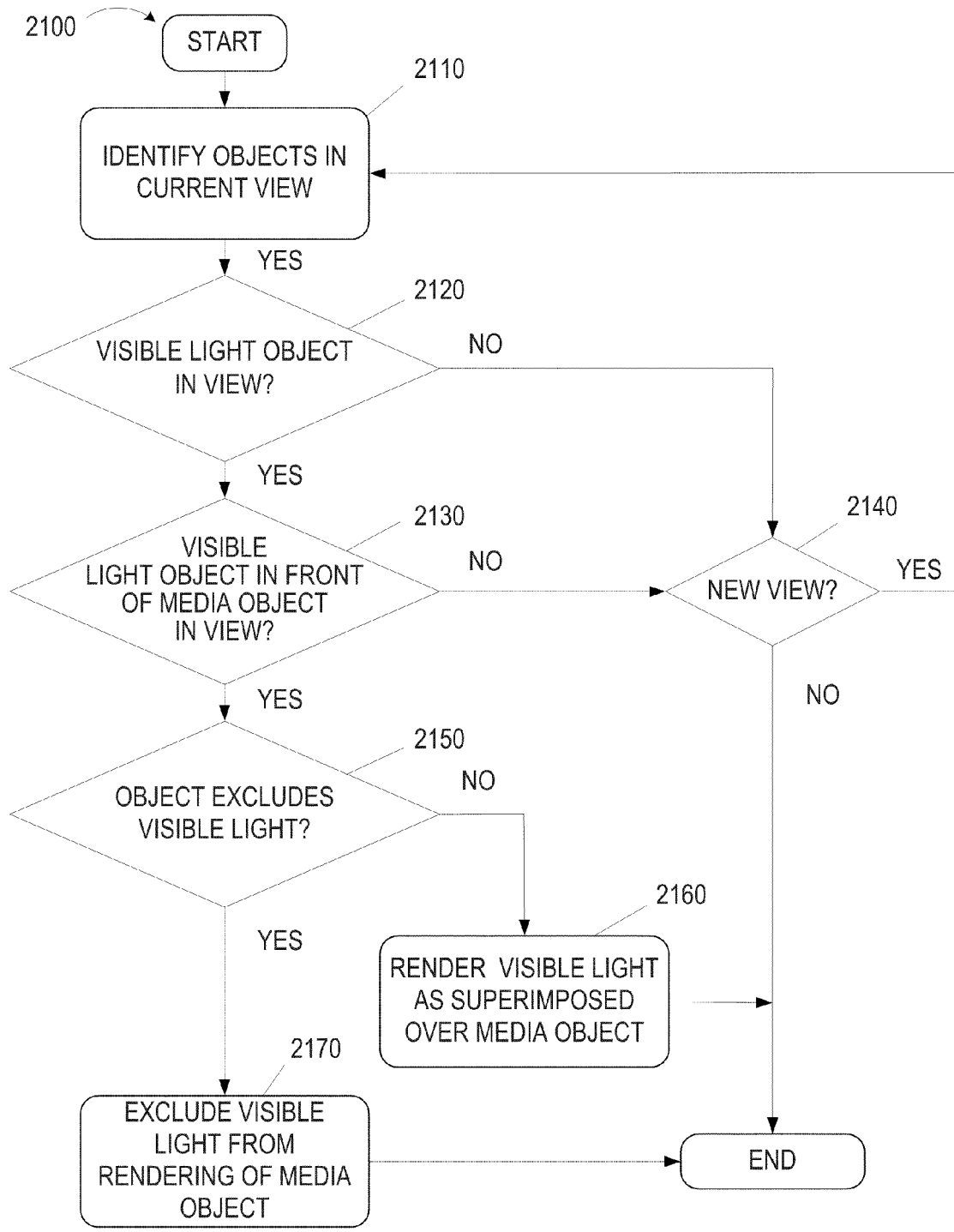
FIG. 21 illustrates an example of a conceptual machine-executed process for determining how a 3D compositing application presents visible spot light volume depending on whether the Exclude Visible control is checked, according to some embodiments of the invention.

FIG. 21 illustrates an example of a conceptual machine-executed process 2100 for determining how 3D compositing application 600 presents visible spot light volume 1210 depending on whether the Exclude Visible control 2020 is checked. The process is a conceptual representation of the operations that are performed by 3D compositing application 600 for interactively generating display presentations. The specific operations of the process may not be performed in the exact order described. The specific operations may not be performed in one continuous series of operations. Different specific operations may be performed in different embodiments. Furthermore, the process could be implemented using several sub-processes, or as part of a larger macro-process.

As shown, the process 2100 identifies (at 2110) objects that are in the current view of the 3D space of a 3D project as presented in an 3D composite display area of a 3D compositing application. The process determines (at 2120) whether a visible light object, such as a visible spot light volume representation, is visible in the current view. When a visible light object is not visible in the current view, the process proceeds to 2140, which is described below. Otherwise, the process determines (at 2130) whether the visible light object is in front of any media object in the view. When the visible light object is not in front of any media object in the view, the process proceeds to 2140, which is described below. When the visible light object is in front of a media object, the process then determines (at 2150) whether the object's Exclude Light parameter is checked. When the object's Exclude Light parameter is checked, the process excludes (at 2170) visible light from the interactive display presentation generation of the media object. Otherwise, then the process displays (at 2160) the visible light object as superimposed over the media object. The process then ends.

When the process determines (at 2120) that there is not any visible light object in the view, or determines (at 2130) that visible light objects in the view are not in front of any media object in the view, the process determines (at 2140) whether there is a new view presented in the 3D composite display area of the 3D compositing application. A new view can be caused by any changes to the composition of the objects in the 3D space from the same camera perspective, or can be caused by setting a different camera perspective. When a new view is presented the process proceeds to 2110, which is describe above. Otherwise, the process ends.

Certain render settings may be applied to the overall 3D project to specify the general rendering effect of all visible light sources in the 3D project. In the following discussion, "render" refers to either the interactive generation of a display presentation, or a fixed output for the scene that is generated offline. In particular, a user may specify whether all visible light sources will be rendered on an object-based basis, or on a scene-based basis. When scene-based visible light rendering is specified, visible light is rendered in front of all objects in the 3D space. Thus, in scene-based visible light rendering, a visible spot light volume will be rendered as fully superimposed over all objects in the 3D space, even if the visible light is positioned behind an object in the 3D space, and should otherwise be occluded or partially occluded by the object.

Figure 22:
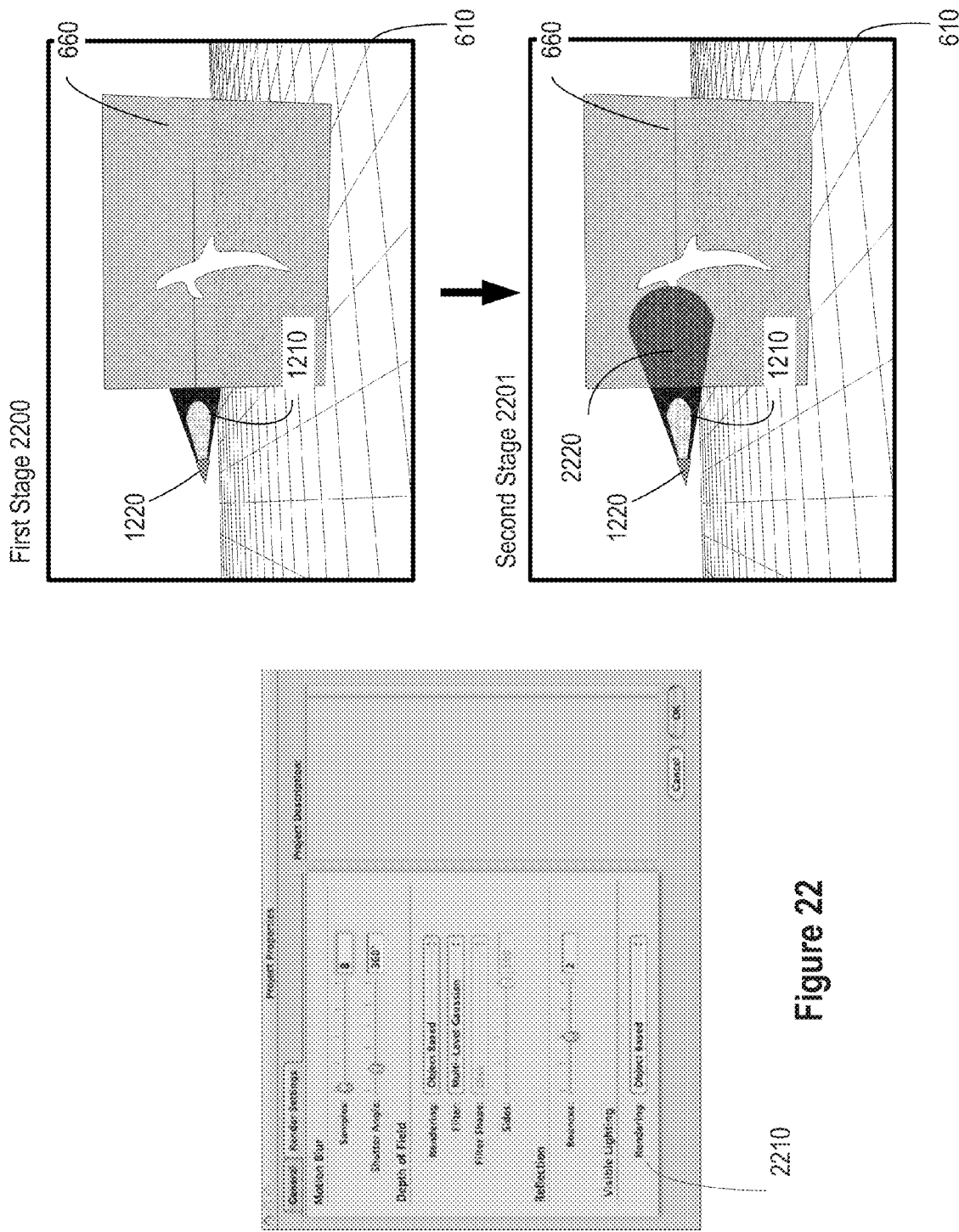
FIG. 22 illustrates the different effects between rendering with an object-based rendering setting and a scene-based setting, according to some embodiments of the invention.

When object-based visible light rendering is specified, visible light is rendered depending on the relative positioning of the visible light source relative to the objects in the 3D space. In the example as illustrated in FIG. 22, Visible Light Rendering control 2210 is set to Object-Based, and the position of media object 660 is moved from in front of visible spot light volume 1210 to the middle of visible spot light volume 1210. At First Stage 2200, media object 660 is positioned in front of visible spot light volume 1210. Because visible spot light volume 1210 is behind media object 660 in the 3D space, no part of visible spot light volume 1210 is superimposed over media object 660. At Second Stage 2201, media object 660 is positioned in the middle of visible spot light volume 1210, such that a portion of visible spot light volume 1210 appears in front of media object 660, and a portion of visible spot light volume 1210 appears behind media object 660. Accordingly, the intersecting portion 2220 of visible spot light volume 1210 is rendered as partially superimposed over media object 660.

IV. Calculating Parameters Required for Interactive Display Presentation Generation The 3D compositing application 600 provides lighting tools which provide visible light sources for which an interactively generated display presentation is displayed in the 3D composite display area 610 to provide the user with immediate feedback regarding the current appearance of the visible light sources during the compositing stage of the 3D project.

Figure 23:
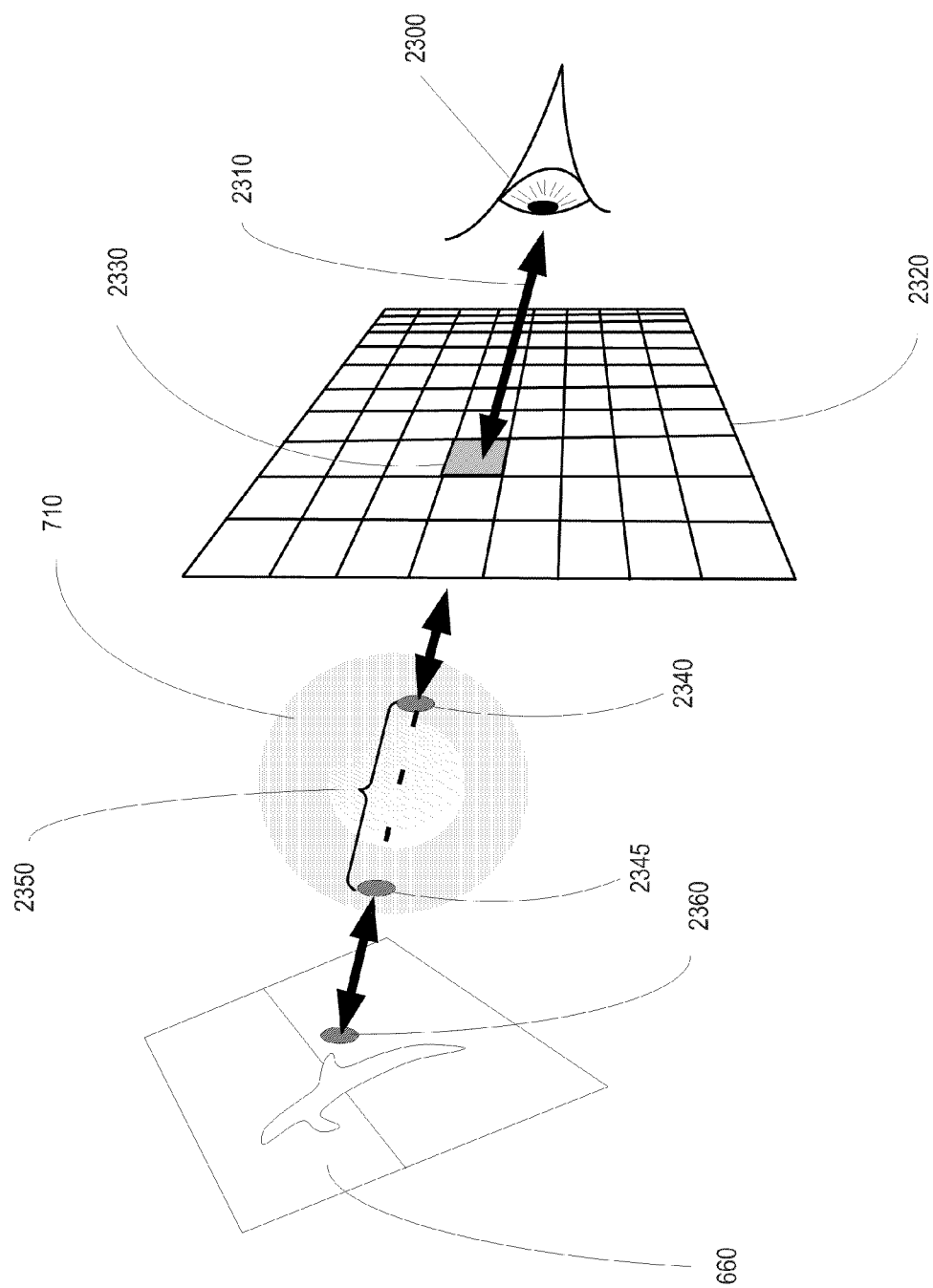
FIG. 23 illustrates an example of a ray that is cast through the 3D scene, according to some embodiments of the invention.

In some embodiments, interactive display presentation generation of the visible light sources is achieved by performing single-cast ray casting on the 3D scene to generate a set of numerical values that define the appearance of each pixel to be displayed in 3D composite display area 610. FIG. 23 illustrates a conceptual example of how a single imaginary ray is cast through a scene to determine the appearance of a particular pixel. FIG. 23 illustrates an eye 2300 (or a camera) from which a ray 2310 is constructed. Ray 2310 is projected through viewing plane 2320, which represents the viewing surface of 3D composite display area 610. Viewing plane 2320 is composed of an array of pixels. Ray 2310 intersects viewing plane 2320 at pixel 2330. The size of a cross-section area of ray 2310 the same as the size of pixel 2330.

FIG. 23 also illustrates a visible light source, shown as visible point light 710. In some embodiments, the visible light source is a visible spot light, or any light as described above. As shown in FIG. 23, ray 2310 enters visible point light 710 at point light entry 2340 and exits at point light exit 2345. Accordingly, ray 2310 intersects visible point light 710 through the section 2350. Ray 2310 next intersects media object 660 at object intersection 2360.

All the objects intersected by ray 2310 contribute determining a color value for pixel 2330. In some embodiments, a color value is independently determined for each point of intersection with the ray. A color value includes composite color values, such as a Red-Green-Blue triple, that can be interpreted by an electronic display to display a pixel. Other color models can be used to define pixels. The independently determined color values for each intersection point are combined, or blended, by a blending operation to produce a color value for pixel 2330. An example of such a blending operation is described below with reference to Equation 2.

For some embodiments, for objects that have volume, such as a 3D object like visible point light 710, a color value is determined for a section of a ray, such as section 2350. In some embodiments, section 2350 is divided into many small sections, a color value is determined for each of the small sections, and blending operations are applied to generate a color value for section 2350. In some other embodiments, techniques are employed to quickly estimate a color value for the section without determining color values for smaller sections. An example of a technique used to determine a color value for a section of a ray without determining color values for smaller sections is described below with reference to Equation 1.

For some embodiments, color values that are determined for ray sections that intersect visible light sources are not outputted to the 3D compositing application. Instead, the color value for the ray section is blended with the color value for object intersection 2360 to produce a blended color value, and the blended color value is outputted to the media compositing application for object intersection 2360. As a result, the visible light source is not represented in the media compositing application as a rendered object. Instead, the visible light source is rendered together with the object that is behind the visible light source.

Figure 24:
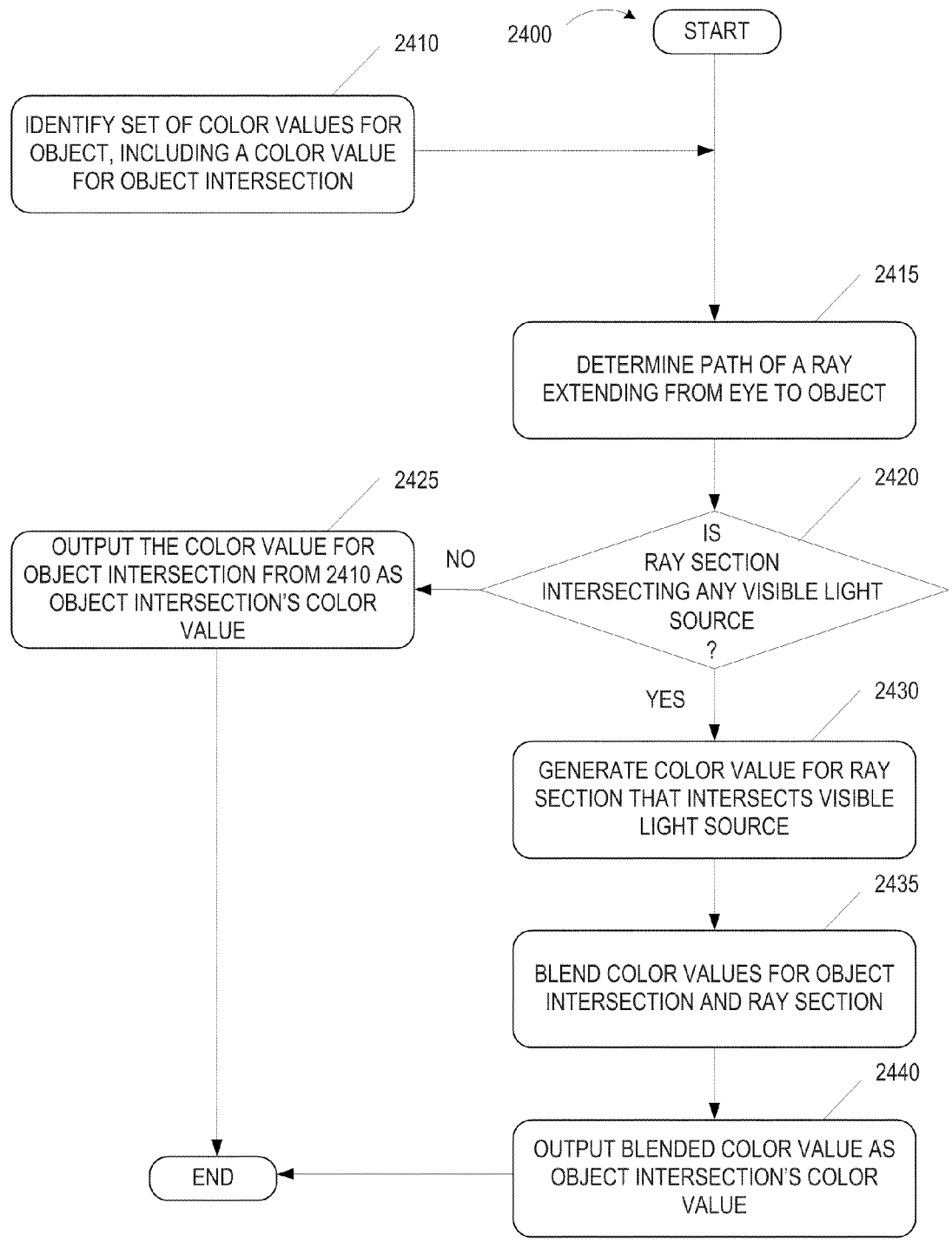
FIG. 24 is a flow diagram that illustrates steps that may be executed by the 3D compositing application to calculate the parameters required for the rendering, according to some embodiments of the invention.

FIG. 24 illustrates an example of a conceptual machine-executed process 2400 that is employed for determining color values for an object in a 3D scene. In particular, the process 2400, as shown in FIG. 24, is a conceptual representation of the operations that are performed by 3D compositing application 600 for determining a color value for the object intersection 2360 to output. The outputted color value can be further blended with any other color values for other intersection points or sections determined for ray 2310 to produce a final color value for pixel 2330.

The specific operations of the process may not be performed in the exact order described. The specific operations may not be performed in one continuous series of operations. Different specific operations may be performed in different embodiments. Furthermore, the process could be implemented using several sub-processes, or as part of a larger macro-process.

As shown, the process 2400 identifies (at 2410) a set of color values for object 660. The color values are determined based on the surface incident light from any light effects that are added to the scene. Such surface incident light includes illumination of surfaces from light sources such as ambient lights, point light sources, or spot light sources. In some embodiments, surface incident light values for all the objects in the current view are previously calculated in a separate process.

Next, the process determines (at 2415) the path of a ray that extends from the location of a conceptual eye through pixel 2330 to an object 660. The process then determines (at 2420) whether that the ray intersects a visible light source through ray section 2350. When the ray does not intersect a visible light source, the process uses (at 2425) a color value identified at 2410 as the output color value for objection intersection 2360. Then the process ends. Otherwise, the process generates (at 2430) a color value for ray section 2350. The process blends (at 2435) the color value determined at 2410 for the object intersection with the color value determined at 2430 for the ray section. The process outputs the blended color value as output color value for object intersection 2360. Then the process ends.

The following describes techniques used for generating a color value for ray section 2350. In particular, the following technique quickly estimates a color value for the section without determining discrete color values for smaller sections.

The section light value (SectionValue) for ray section 2350 through the halo portion of visible point light 710 can be generally expressed by the following Equation 1:

$$\text{SectionValue} = \text{SectionLength} \times \text{Density} \times \text{Intensity} \quad (1)$$

The combined effects of the physical characteristics of visible point light 710 through ray section 2350 are used to generate a color value for ray section 2350 of the ray 2310. The physical characteristics of the visible point light 710 employed in the technique include the length of section 2350. The length of section 2350 ("SectionLength") is based on the specified size of visible point light 710 and the extent of the halo. Density and Intensity are parameters that are described above by reference to FIGS. 6-16.

The following describes one example of a blending operation to blend the color values of the object intersection and the ray section, as discussed above with reference to operation 2435 of FIG. 24. The display value for the particular area intersected by ray 2310 can be expressed by the following Equation 2:

$$\text{IntersectionValue} = ((1.0 - \text{Density}) \times \text{ObjectColorValue}) + (\text{Density} \times \text{SectionColorValue}) \quad (2)$$

In Equation 2, the Density value is a percentage of occlusion caused by the visible point light 710 on object intersection 2360. The ObjectColorValue refers to the color value for the object intersection identified at 2410. The SectionColorValue refers to the color value of the ray section 2350 determined at 2430. The InteractionValue is the final value outputted at 2440. According to Equation 2, the higher the Density value, the less weight ObjectColorValue has in determining the IntersectionValue.

This process 2400 can be used to produce, at interactive speeds, a display presentation of a scene as arranged in the example shown in FIG. 23 by outputting only final displays values for the media object 660 without outputting any display values separately for the visible point light 710. Accordingly, by this process, the visible point light itself does not need to be fully rendered as an object in 3D space to generate a display presentation that includes a visible point light. Omitting rendering calculations for the visible point light efficiently reduces the calculations necessary to generate a display presentation with the visible point light. The efficiency produced by this technique allows process 2400 to be executed to generate display presentations at interactive speeds.

The above process was performed with respect to the object intersection 2360 being occluded by the halo portion visible point light. A similar process may be carried out to calculate a final display value if the object intersection were occluded by a visible spot light volume. To execute the process with respect to a visible spot light value, a SectionValue is determined using a combination of physical characteristics that are appropriate for a visible spot light value. For example, instead of Equation 1, the following equation is used to determine Section Value for a visible spot light volume:

$$\text{SectionValue} = \text{SectionLength} \times \text{Density} \times \text{Falloff} \times \text{SoftEdge} \quad (3)$$

V. Software Architecture

Figure 25:
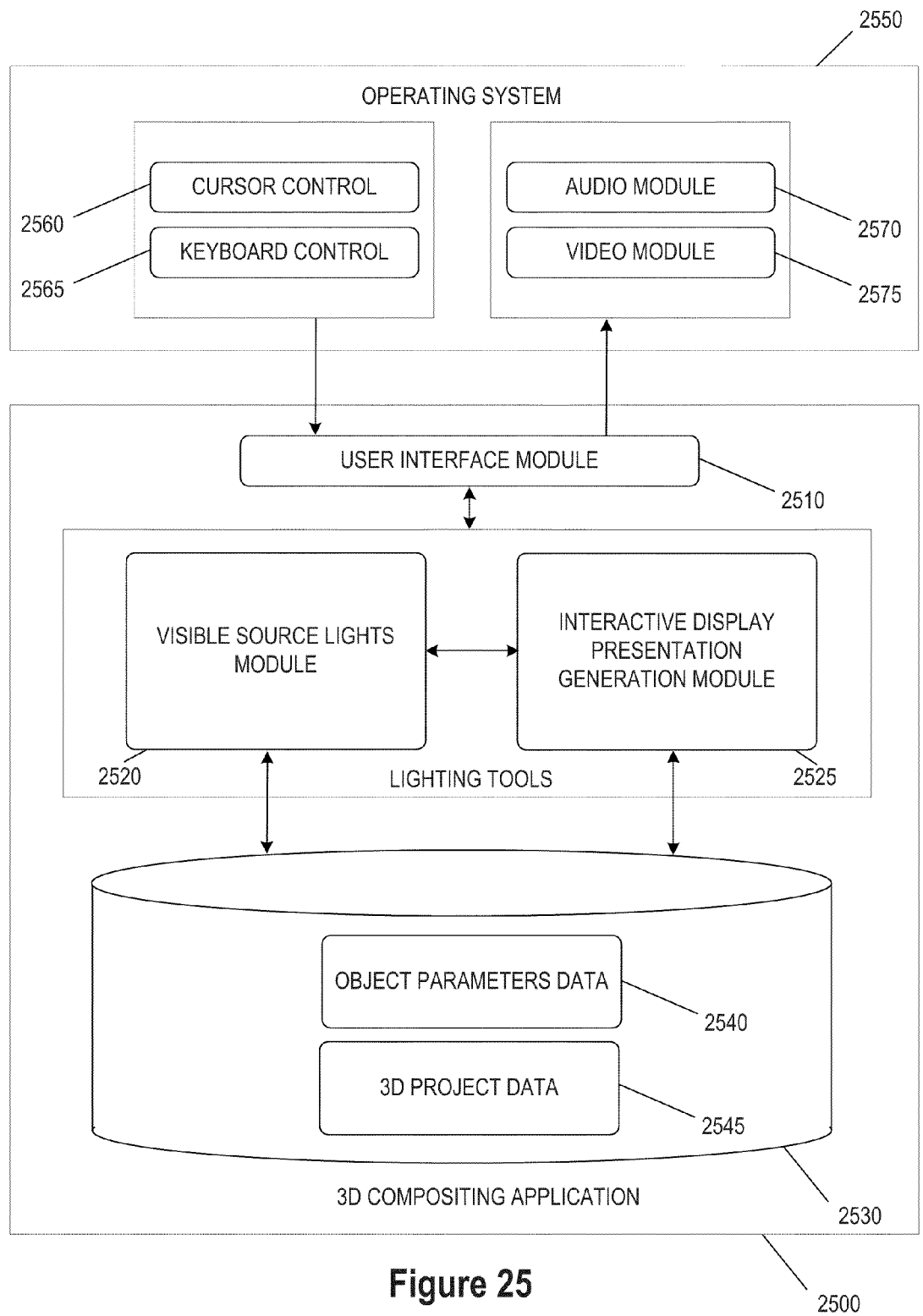
FIG. 25 conceptually illustrates the software architecture of a 3D compositing application of some embodiments for presenting visible light sources such as those described in the preceding figures.

In some embodiments, the processes described above are implemented as software running on a particular machine, such as a computer or a handheld device, or stored in a computer readable medium. FIG. 25 conceptually illustrates the software architecture of an 3D compositing application 2500 of some embodiments for presenting visible light sources such as those described in the preceding sections. In some embodiments, the application is a stand-alone application or is integrated into another application (for instance, application 2500 might be a portion of a video-editing application), while in other embodiments the application might be implemented within an operating system. Furthermore, in some embodiments, the application is provided as part of a server-based (e.g., web-based) solution. In some such embodiments, the application is provided via a thin client. That is, the application runs on a server while a user interacts with the application via a separate client machine remote from the server (e.g., via a browser on the client machine). In other such embodiments, the application is provided via a thick client. That is, the application is distributed from the server to the client machine and runs on the client machine.

As shown in FIG. 25, the 3D compositing application 2500 includes a user interface module 2510 for sending data to and receiving data from a user, a visible light sources module 2520 for processing visible light data, including managing visible light sources input received from user interface module 2510, an interactive display presentation generation module 2525 for calculating the parameters necessary for rendering objects included in a 3D project, and for outputting the interactively generated display presentations to user interface module 2510, and storage 2530 for storing data used by the application 2500. Storage 2530 stores object parameters data 2540, 3D project data 2545, as well as other data used by media editing application 2500.

Object parameters data 2540 include visible light parameters data that are used by interactive display presentation generation module 2525 for performing the rendering calculations. Visible light parameters data include the values that are set for the various visible light sources included in a 3D project, as well as position data and any other data related to the visible light sources.

Display presentation instructions data 2545 include instructions and routines used by interactive display presentation generation module 2525 for performing the rendering calculations that produce an interactively generated display presentation of the 3D space of the 3D project. Display presentation instructions data 2545 also include values for user-defined rendering parameters that generally modify the rendering behavior of 3D composition application. For example, display presentation instructions data 2545 include data that identifies whether visible light the 3D project is rendered on a scene-based basis, or on an object-based basis.

FIG. 25 also illustrates several components of operating system 2550 that provide input to, and receives output from, 3D compositing application 2500 via user interface module 2510. Such components include cursor control 2560 that allows the application 2500 to receive data from a cursor control device, keyboard control 2565 that allows the application 2500 to receive data from a keyboard, audio module 2570 for processing audio that that will be supplied to an audio output device (e.g. speakers), and video module 2575 for processing video data that will be supplied to a display device (e.g., a monitor).

A user interacts with items in the user interface of the media editing application 2500 via input devices (not shown) such as a pointing device (e.g., a mouse, touchpad, trackpad, etc.) and keyboard. The input from these devices is processed by the cursor control 2560 and keyboard control 2565, and passed to the user interface interaction module 2510.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The user interface module 2510 translates the data from the controls 2560 and 2565 into the user's desired effect on the 3D compositing application 2500. Visible light sources module 2520 and interactive display presentation generation module 2525 use such input to carry out the operations as described with reference to FIG. 25 above. For example, when a user moves a cursor to select a control for adjustment, or selects an object from the composite display area to make active, user interface module 2510 receives such input from the user, and translates the input into commands that can be processed by visible light sources module 2520 or interactive display presentation generation module 2525.

The following describes the interaction between the modules according to one example of some embodiments of the invention. Visible light sources module receives a command to render a visible light source for a particular light object in the 3D project. Visible light sources module 2520 retrieves the associated parameters data for the light from object parameters data 2540, and sends the parameters to interactive display presentation generation module 2525 for producing an interactively generated display presentation of the visible light source.

Interactive display presentation generation module 2525 uses the associated parameters data, in conjunction with the applicable display presentation instructions from display presentation instructions data 2545, to perform the calculations necessary for producing an interactively generated display presentation of the visible light source. Interactive display presentation generation module 2525, after performing the calculations, outputs the interactively generated display presentation to the user interface module 2510 and video module 2575 for presenting to the user. When the user interface module 2510 receives input that modifies or adjusts the view, due to a change in the objects in the 3D space or a change in the camera perspective chosen for the 3D space, interactive display presentation generation module 2525 updates the interactively generated display presentation to reflect the changes.

While many of the features have been described as being performed by one module (e.g., the user interface module 2510 or zone analysis module 2520), one of ordinary skill would recognize that a particular operation might be split up into multiple modules, and the performance of one feature might even require multiple modules in some embodiments.

One of ordinary skill in the art will recognize that the conceptual descriptions provided above in reference to FIG. 25 may be implemented using different embodiments without departing from the spirit of the invention. For instance, storage 2530 described above with reference to FIG. 25 may be implemented as various storage elements.

VI. Process for Defining a Media Editing Application

Figure 26:
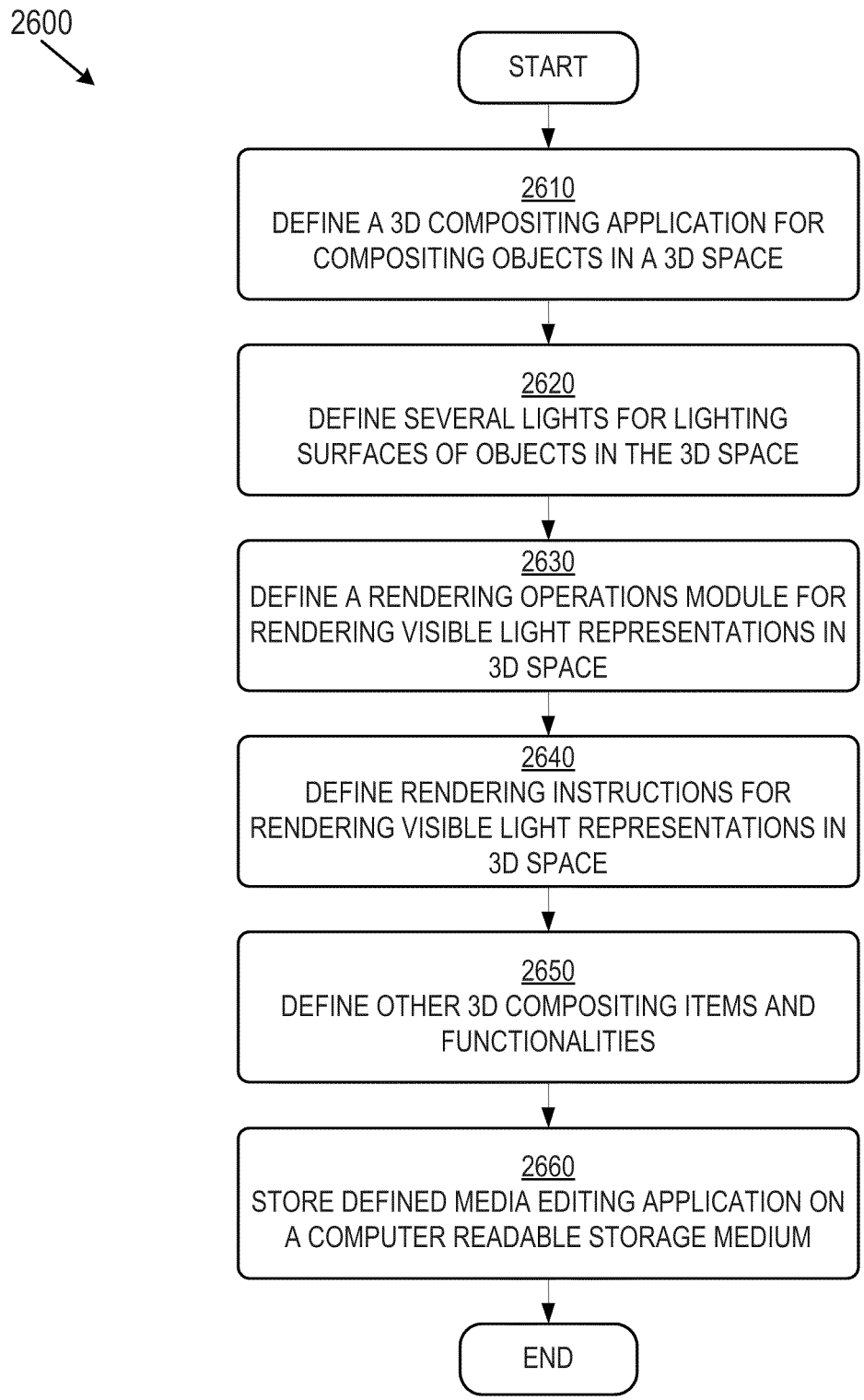
FIG. 26 conceptually illustrates a process of some embodiments for defining and storing a media-editing application of some embodiments.

FIG. 26 conceptually illustrates a process 2600 of some embodiments for defining and storing a media-editing application of some embodiments, such as application 2500. Specifically, process 2600 illustrates the operations used to define several of the elements shown in 3D compositing application 600. As shown, process 2600 begins by defining (at 2610) a 3D compositing application for compositing objects in a 3D space. 3D compositing application 600 is one example of such a compositing application.

The process then defines (at 2620) a plurality of lights for lighting surfaces of objects in the 3D space. Lights may include a point light, a spot light, an ambient light, and a directional light. Lights may also correspond to real-world lighting sources such as a glowing filament, a fluorescent bulb, a single or an array of light emitting diodes (LEDs), a neon tube, or a light bulb with a parabolic aluminized reflector such as a spot light.

The process then defines (at 2630) an interactive display presentation generation module for interactively generating display presentations of visible light sources in 3D space, and also defines (at 2640) various display presentation instructions for rendering the visible light sources.

The process then defines (at 2650) other 3D compositing items and functionalities. Examples of such 3D compositing items may include may include camera behavior, color enhancement, audio mixing, etc. In addition, various other media editing functionalities may be defined. Such functionalities may include library functions, format conversion functions, etc. The process defines these additional tools in order to create a 3D compositing application that has many additional features to the features described above.

Process 2600 then stores (at 2660) the defined 3D compositing application (i.e., the defined modules, UI items, etc.) on a computer readable storage medium. The computer readable storage medium may be a disk (e.g., CD, DVD, hard disk, etc.) or a solid-state storage device (e.g., flash memory) in some embodiments. One of ordinary skill in the art will recognize that the various elements defined by process 2600 are not exhaustive of the modules, rules, processes, and UI items that could be defined and stored on a computer readable storage medium for a media editing application incorporating some embodiments of the invention. In addition, the process 2600 is a conceptual process, and the actual implementations may vary. For example, different embodiments may define the various elements in a different order, may define several elements in one operation, may decompose the definition of a single element into multiple operations, etc. In addition, the process 2600 may be implemented as several sub-processes or combined with other operations within a macro-process.

VII. Computer System

Many of the above-described processes and modules are implemented as software processes that are specified as a set of instructions recorded on a computer readable storage medium (also referred to as "computer readable medium" or "machine readable medium"). When these instructions are executed by one or more computational element(s), such as processors or other computational elements like application-specific ICs ("ASIC") and field-programmable gate arrays ("FPGA"), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and/or electronic signals passing wirelessly or over wired connections.

In this specification, the term "software" includes firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 27:
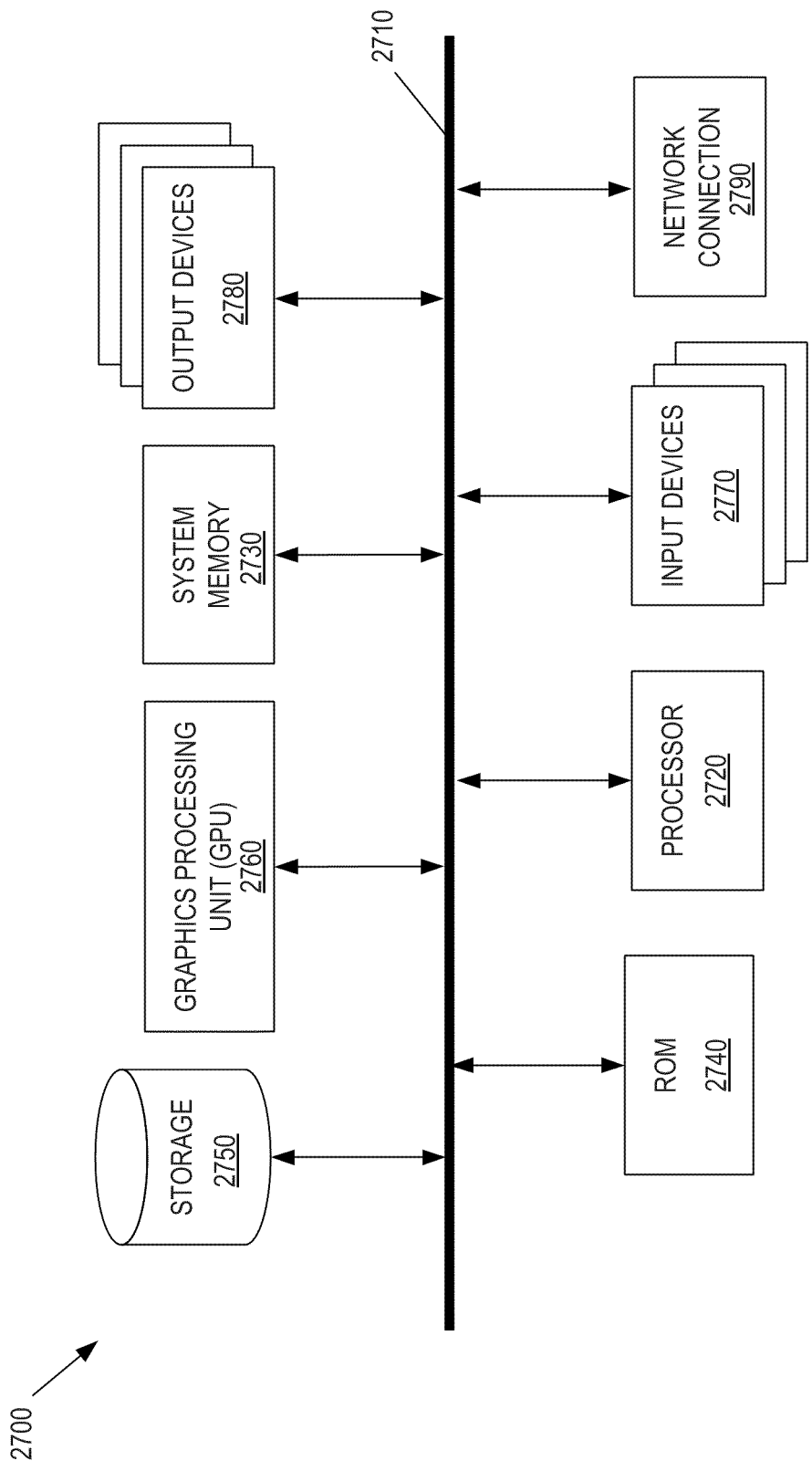
FIG. 27 illustrates a computer system with which some embodiments of the invention are implemented.

FIG. 27 illustrates a computer system with which some embodiments of the invention are implemented. Such a computer system includes various types of computer readable mediums and interfaces for various other types of computer readable mediums. Computer system 2700 includes a bus 2705, a processor 2710, a graphics processing unit (GPU) 2720, a system memory 2725, a read-only memory 2730, a permanent storage device 2735, input devices 2740, and output devices 2745, and a network connection 2790. The components of the computer system 2700 are electronic devices that automatically perform operations based on digital and/or analog input signals. The various examples of user interfaces shown in FIGS. 3-4, 6, 7, and 12 may be at least partially implemented using sets of instructions that are run on the computer system 2700 and displayed using the output devices 2780.

One of ordinary skill in the art will recognize that the computer system 2700 may be embodied in other specific forms without deviating from the spirit of the invention. For instance, the computer system may be implemented using various specific devices either alone or in combination. For example, a local PC may include the input devices 2770 and output devices 2780, while a remote PC may include the other devices 2710-2760, with the local PC connected to the remote PC through a network that the local PC accesses through its network connection 2790 (where the remote PC is also connected to the network through a network connection).

The bus 2705 collectively represents all system, peripheral, and chipset buses that communicatively connect the numerous internal devices of the computer system 2700. For instance, the bus 2705 communicatively connects the processor 2710 with the read-only memory 2730, the GPU 2720, the system memory 2725, and the permanent storage device 2750. In some cases, the bus 2710 may include wireless and/or optical communication pathways in addition to or in place of wired connections. For example, the input devices 2770 and/or output devices 2780 may be coupled to the system 2700 using a wireless local area network (W-LAN) connection, Bluetooth®, or some other wireless connection protocol or system.

From these various memory units, the processor 2710 retrieves instructions to execute and data to process in order to execute the processes of the invention. In some embodiments the processor includes an FPGA, an ASIC, or various other electronic components for executing instructions. Some instructions are passed to and executed by the GPU 2720. The GPU 2720 can offload various computations or complement the image processing provided by the processor 2710. Such functionality can be provided using CoreImage's kernel shading language.

The read-only-memory (ROM) 2730 stores static data and instructions that are needed by the processor 2710 and other modules of the computer system. The permanent storage device 2735, on the other hand, is a read-and-write memory device. This device is a non-volatile memory unit that stores instructions and data even when the computer system 2700 is off. Some embodiments of the invention use a mass-storage device (such as a magnetic or optical disk and its corresponding disk drive) as the permanent storage device 2735.

Other embodiments use a removable storage device (such as a floppy disk, flash drive, or CD-ROM) as the permanent storage device. Like the permanent storage device 2735, the system memory 2725 is a read-and-write memory device. However, unlike storage device 2735, the system memory 2725 is a volatile read-and-write memory, such as a random access memory (RAM). The system memory stores some of the instructions and data that the processor needs at runtime. In some embodiments, the sets of instructions and/or data used to implement the invention's processes are stored in the system memory 2725, the permanent storage device 2735, and/or the read-only memory 2730. For example, the various memory units include instructions for processing multimedia items in accordance with some embodiments. From these various memory units, the processor 2720 retrieves instructions to execute and data to process in order to execute the processes of some embodiments.

In addition, the bus 2710 connects to the GPU 2760. The GPU of some embodiments performs various graphics processing functions. These functions may include display functions, rendering, compositing, and/or other functions related to the processing or display the objects within the 3D space of the media-editing application.

The bus 2705 also connects to the input devices 2740 and output devices 2745 The input devices 2740 enable the user to communicate information and select commands to the computer system. The input devices 2740 include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 2745 include printers, electronic display devices that display still or moving images, and electronic audio devices that play audio generated by the computer system. For instance, these display devices may display a GUI. The output devices include display devices, such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computer system.

Finally, as shown in FIG. 27, bus 2705 also couples computer 2700 to a network 2765 through a network adapter (not shown). In this manner, the computer can be a part of a network of computers (such as a local area network ("LAN"), a wide area network ("WAN"), an Intranet, or a network of networks, such as the Internet. For example, the computer 2700 may be coupled to a web server (network 2765) so that a web browser executing on the computer 2700 can interact with the web server as a user interacts with a graphical user interface that operates in the web browser.

As mentioned above, the computer system 2700 may include one or more of a variety of different computer-readable media (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by a device such as an electronics device, a microprocessor, a processor, a multi-processor (e.g., a chip with several processors on it) and includes sets of instructions for performing various operations. The computer program excludes any wireless signals, wired download signals, and/or any other ephemeral signals.

Examples of hardware devices configured to store and execute sets of instructions include, but are not limited to, ASICs, FPGAs, programmable logic devices ("PLD"), ROM, and RAM devices. Examples of computer programs or computer code include machine code, such as produced by a compiler, and files including higher-level code that are executed by a computer, an electronic component, and/or a microprocessor using an interpreter.

As used in this specification and any claims of this application, the terms "computer", "server", "processor", and "memory" all refer to electronic or other technological devices. These terms exclude people or groups of people. For the purposes of this specification, the terms display or displaying means displaying on an electronic device. As using in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It should be recognized by one of ordinary skill in the art that any or all of the components of computer system 2700 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. For example, several embodiments were described above by reference to particular media editing applications with particular features and components (e.g., particular composite display areas). However, one of ordinary skill will realize that other embodiments might be implemented with other types of media editing applications with other types of features and components (e.g., other types of composite display areas).

Moreover, while the examples shown illustrate certain individual modules as separate blocks (e.g., visible light sources module 2520, the interactive display presentation generation module 2525, etc.), one of ordinary skill in the art would recognize that some embodiments may combine these modules into a single functional block or element. One of ordinary skill in the art would also recognize that some embodiments may divide a particular module into multiple modules.

One of ordinary skill in the art will realize that, while the invention has been described with reference to numerous specific details, the invention can be embodied in other specific forms without departing from the spirit of the invention. For instance, while Apple Mac OS® environment and Apple Motion® tools are used to create some of these examples, a person of ordinary skill in the art would realize that the invention may be practiced in other operating environments such as Microsoft Windows®, UNIX®, Linux®, etc., and other applications such as Autodesk Maya®, and Autodesk 3D Studio Max®, etc. Alternate embodiments may be implemented by using a generic processor to implement the video processing functions instead of using a GPU. One of ordinary skill in the art would understand that the invention is not to be limited by the foregoing illustrative details, but rather is to be defined by the appended claims.

I claim:

1. A method of defining a media editing application that when executed by at least one processor creates media presentations, the method comprising:
    defining a composite display area for compositing a three-dimensional scene that is defined by three axes; and
    defining a set of lighting tools for:
        interactively incorporating at least one visible source of light at any position along the three axes of the three-dimensional scene as a rendered object in the composited three-dimensional scene; and
        changing properties of the visible source of light, wherein a first subset of lighting tools for changing properties of a first type of source of light is displayed when the first type is selected and a second subset of lighting tools for changing properties of a second type of source of light is displayed when the second type is selected,
    wherein a lighting tool in the set of lighting tools is for enabling or disabling an emission of light produced by the visible source of light into the scene,
    wherein changing the position of the visible source of light along each one of the three axes and independent of the other two of the three axes causes the emission of light to track the position of the visible source of light within the three-dimensional scene.

2. The method of claim 1, wherein the visible source of light is a first object that interacts with at least a second object that is composited in the three-dimensional scene.

3. The method of claim 1, wherein interactively incorporating the visible source of light comprises performing a set of operations to render a media object, the set of operations for:
    identifying a surface display value for an intersection of the media object;
    determining a path of a ray extending from an eye through the three-dimensional scene;
    determining that a section of the ray intersects the visible source of light;
    generating a light value for the ray section; and
    calculating a final display value for the media object intersection based on the surface display value and the light value.

4. The method of claim 1, wherein the three-dimensional scene comprises a set of objects, wherein the set of lighting tools is further for rendering the visible source of light object by defining (i) a surface light that is cast onto a set of objects in the three-dimensional scene and (ii) a plurality of light rays emanating from the visible source of light object that is visible in the three-dimensional scene.

5. The method of claim 4, wherein the lighting tool enables or disables the emission of light from the visible source of light into the scene by toggling the visibility of the plurality of visible light rays in the three-dimensional scene.

6. The method of claim 2, wherein the first object interacts with the second object when one of said first and second objects intersects with the other object in the three-dimensional scene and partially occludes the other object.

7. The method of claim 1, wherein the visible source of light is a visible point light source.

8. The method of claim 7, wherein the visible point light source is defined by a spherical core having light-emitting properties.

9. The method of claim 8, wherein the light-emitting properties specify a visible halo that forms a volume of light around the spherical core.

10. The method of claim 9, wherein the light-emitting properties comprise a density value that defines how dense the halo appears in the three-dimensional scene, wherein the set of lighting tools comprises at least one control for interactively adjusting the density value.

11. The method of claim 8, wherein the set of lighting tools comprises at least one control for interactively adjusting the size of the spherical core.

12. The method of claim 9, wherein the light-emitting properties comprise a diameter value that specifies an extent of the visible halo in the three-dimensional scene, wherein the set of lighting tools comprises at least one control for interactively adjusting the diameter value to modify the extent.

13. The method of claim 1, wherein a display presentation of the visible source of light is interactively generated in the composite display area from any camera perspective.

14. The method of claim 1, wherein the set of lighting tools are for incorporating two or more visible sources of light into the three-dimensional scene.

15. A non-transitory computer readable medium storing a computer program that when executed by at least one processing unit provides a graphical user interface ("GUI") for creating media presentations, the GUI comprising:
    a composite display area for compositing a three-dimensional scene that is defined by three axes; and
    a set of lighting tools for:
        incorporating, into the three-dimensional scene, at least one visible source of light representing an artificial light source by allowing a user to specify a position of the visible source of light in the three-dimensional scene and move the visible source of light along each of the three axes independent of the other two of the three axes, wherein the visible source of light is a rendered object in the composited three-dimensional scene,
        wherein a lighting tool in the set of lighting tools is for enabling or disabling an emission of light produced by the visible source of light into the scene, wherein the emission of light tracks the position of the visible source of light within the three-dimensional scene; and
        changing properties of the visible source of light, wherein a subset of lighting tools is for changing sizes of the source of light and a halo surrounding the source of light independent of each other.

16. The non-transitory computer readable medium of claim 15, wherein the artificial light source comprises one of a light bulb, a glowing filament, a flame from a candle or torch, a fluorescent bulb, a single or an array of light emitting diodes (LEDs), a neon tube, and a light bulb with a parabolic aluminized reflector.

17. The non-transitory computer readable medium of claim 15, wherein the artificial light source does not comprise any light-emitting celestial bodies.

18. The non-transitory computer readable medium of claim 15, wherein the composite display area is further for receiving a user input that positions the visible source of light in the three-dimensional scene.

19. The non-transitory computer readable medium of claim 15, wherein the set of lighting tools comprises at least one control for receiving a user input of a set of coordinates for the three axes that defines the position of the visible source of light in the three-dimensional scene.

20. A non-transitory computer readable medium storing a computer program that when executed by at least one processing unit creates media presentations, the computer program comprising sets of instructions for:
  compositing, in a composite display area, a three-dimensional scene that is defined by three axes in the composite display area;
  defining a set of lighting tools for:
    interactively incorporating at least one visible source of light into the three-dimensional scene as a rendered object of the composited three-dimensional scene, wherein a lighting tool in the set of lighting tools is for enabling or disabling an emission of light produced by the visible source of light into the scene; and
    changing properties of the visible source of light, wherein a first subset of lighting tools for changing properties of a first type of source of light is displayed when the first type is selected and a second subset of lighting tools for changing properties of a second type of source of light is displayed when the second type is selected; and
    modifying, based on a set of user inputs, a position of the visible source of light along any one of the three axes independent of the other two of the three axes, wherein the emission of light tracks the position of the visible source of light within the three-dimensional scene.

21. The non-transitory computer readable medium of claim 20, wherein the three-dimensional scene comprises a set of objects, wherein the set of instructions for incorporating the visible source of light object comprises a set of instructions for specifying (i) a surface light that is cast onto the set of objects in the three-dimensional scene and (ii) a plurality of light rays emanating from the visible source of light object that is visible in the three-dimensional scene.

22. The non-transitory computer readable medium of claim 21, wherein the set of lighting tools further comprises a set of adjustment controls for specifying properties of the plurality of light rays, wherein the plurality of light rays is visible in an area about the visible source of light object, wherein the set of adjustment controls comprises at least one lighting control for enlarging or reducing the area in which the plurality of light rays is visible in the three-dimensional scene.

23. The non-transitory computer readable medium of claim 21, wherein the set of lighting tools further comprises a set of adjustment controls for specifying properties of the plurality of light rays, wherein the plurality of light rays is at least partially transparent in the three-dimensional scene, wherein the set of adjustment controls comprises at least one control for modifying the transparency of the plurality of light rays.

24. The non-transitory computer readable medium of claim 21, wherein the set of lighting tools further comprises a set of adjustment controls for specifying properties of the plurality of light rays, wherein the set of adjustment controls comprises at least one control for toggling the plurality of light rays between being visible and not visible in the three-dimensional scene.

* * * * *